(12) United States Patent
Futaki

(10) Patent No.: US 11,483,837 B2
(45) Date of Patent: Oct. 25, 2022

(54) METHOD AND APPARATUSES FOR SELECTING BEAM IN CARRIER AGGREGATION

(71) Applicant: NEC CORPORATION, Tokyo (JP)

(72) Inventor: Hisashi Futaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/906,024

(22) Filed: Jun. 19, 2020

(65) Prior Publication Data
US 2020/0322945 A1  Oct. 8, 2020

Related U.S. Application Data

(63) Continuation of application No. 16/337,038, filed as application No. PCT/JP2017/018330 on May 16, 2017, now Pat. No. 10,728,900.

(30) Foreign Application Priority Data

Sep. 29, 2016 (JP) ................................. 2016-192329

(51) Int. Cl.
*H04W 72/10* (2009.01)
*H04W 72/04* (2009.01)
(Continued)

(52) U.S. Cl.
CPC ......... *H04W 72/048* (2013.01); *H04L 5/0032* (2013.01); *H04L 5/0051* (2013.01); *H04W 72/085* (2013.01)

(58) Field of Classification Search
CPC ............. H04W 72/0413; H04W 80/02; H04W 52/346; H04W 5/0048; H04W 2/042;
(Continued)

(56) References Cited

U.S. PATENT DOCUMENTS

| 8,259,599 B2 | 9/2012 | Ghady et al. |
| 9,287,958 B2 | 3/2016 | Son et al. |

(Continued)

FOREIGN PATENT DOCUMENTS

| CN | 103188689 A | 7/2013 |
| EP | 3068156 A1 | 9/2016 |

(Continued)

OTHER PUBLICATIONS

Carrier aggregation in Long Term Evolution-Advanced by Mohammed Abduljawad M. Al-Shibly; Mohamed Hadi Habaebi; Jalel Chebil Published in: 2012 IEEE Control and System Graduate Research Colloquium Aug. 2012 (Year: 2012).*

(Continued)

*Primary Examiner* — William D Cumming

(57) ABSTRACT

A radio terminal (2) receives beam configuration information from a base station (1), measures a plurality of transmission beams (10) transmitted from the base station (1) in accordance with the beam configuration information, and uses one or more beams selected from among the plurality of transmission beams (10) based on a measurement result as a serving beam. Each of the plurality of transmission beams carries a beamformed reference signal to be measured by the radio terminal (2). The beam configuration information includes a reference signal configuration indicating a radio resource used on each beam for transmitting the beamformed reference signal. It is thus, for example, possible to contribute to provision of a procedure for UE mobility between beams.

4 Claims, 13 Drawing Sheets

(51) Int. Cl.
*H04L 5/00* (2006.01)
*H04W 72/08* (2009.01)

(58) Field of Classification Search
CPC ... H04W 72/042; H04W 72/80; H04W 16/28; H04W 72/85; H04W 72/048; H04W 52/16; H04W 52/281; H04W 72/10; H04W 76/18; H04W 28/08
See application file for complete search history.

(56) References Cited

U.S. PATENT DOCUMENTS

| | | | |
|---|---|---|---|
| 9,497,785 | B2 | 11/2016 | Schmidt et al. |
| 10,069,555 | B2 | 9/2018 | Islam et al. |
| 10,165,526 | B2* | 12/2018 | Lee .................. H04W 72/0413 |
| 10,257,070 | B2* | 4/2019 | Zhang ................ H04W 72/085 |
| 10,396,914 | B2 | 8/2019 | Nagaraja et al. |
| 10,425,875 | B2* | 9/2019 | Wang .................... H04W 36/30 |
| 10,652,130 | B2* | 5/2020 | Zhang ................... H04W 76/18 |
| 10,660,077 | B2* | 5/2020 | MolavianJazi ..... H04W 52/146 |
| 2014/0162704 | A1 | 6/2014 | Choi et al. |
| 2015/0063203 | A1 | 3/2015 | Kim et al. |
| 2015/0229375 | A1 | 8/2015 | Vook et al. |
| 2015/0351135 | A1 | 12/2015 | Schmidt et al. |
| 2016/0197659 | A1 | 7/2016 | Yu et al. |
| 2016/0353510 | A1* | 12/2016 | Zhang ................... H04W 16/28 |
| 2017/0280365 | A1 | 9/2017 | Wang et al. |
| 2017/0302355 | A1 | 10/2017 | Islam et al. |
| 2017/0303264 | A1 | 10/2017 | Islam et al. |
| 2017/0303265 | A1 | 10/2017 | Islam et al. |
| 2018/0048442 | A1 | 2/2018 | Sang et al. |
| 2018/0054745 | A1 | 2/2018 | Wu |
| 2018/0063828 | A1 | 3/2018 | Wang et al. |
| 2018/0192347 | A1 | 7/2018 | Shaheen |
| 2018/0205469 | A1 | 7/2018 | Nagaraja et al. |
| 2018/0205483 | A1 | 7/2018 | Nagaraja et al. |
| 2018/0220344 | A1 | 8/2018 | Shaheen |
| 2018/0220416 | A1 | 8/2018 | Islam et al. |
| 2018/0323852 | A1 | 11/2018 | Islam et al. |
| 2018/0351624 | A1 | 12/2018 | Hakola et al. |
| 2018/0352453 | A1 | 12/2018 | Gunnarsson et al. |
| 2018/0368204 | A1 | 12/2018 | Park et al. |
| 2019/0141695 | A1 | 5/2019 | Babaei et al. |
| 2019/0141742 | A1 | 5/2019 | Zhou et al. |
| 2019/0199615 | A1* | 6/2019 | Zhang ................... H04W 76/18 |
| 2019/0215712 | A1 | 7/2019 | Babaei et al. |
| 2019/0215870 | A1 | 7/2019 | Babaei et al. |
| 2019/0253119 | A1 | 8/2019 | Lo et al. |
| 2019/0254042 | A1 | 8/2019 | Cirik et al. |
| 2019/0261424 | A1 | 8/2019 | Park et al. |
| 2019/0305840 | A1 | 10/2019 | Cirik et al. |
| 2019/0306765 | A1 | 10/2019 | Cirik et al. |
| 2019/0306867 | A1 | 10/2019 | Cirik et al. |
| 2019/0313457 | A1* | 10/2019 | Tsai ....................... H04L 5/0007 |
| 2019/0349061 | A1* | 11/2019 | Cirik ...................... H04L 5/005 |
| 2019/0380082 | A1* | 12/2019 | Kim ....................... H04W 28/08 |
| 2020/0007292 | A1* | 1/2020 | Huang .................... H04L 5/005 |
| 2020/0045684 | A1 | 2/2020 | Futaki |
| 2020/0053657 | A1* | 2/2020 | MolavianJazi ..... H04W 52/346 |
| 2020/0053710 | A1* | 2/2020 | MolavianJazi ....... H04W 72/10 |
| 2020/0053724 | A1* | 2/2020 | MolavianJazi ... H04W 72/0473 |
| 2020/0100311 | A1* | 3/2020 | Cirik ..................... H04L 5/0094 |
| 2020/0107331 | A1* | 4/2020 | Tsai ...................... H04B 7/0632 |
| 2020/0322945 | A1* | 10/2020 | Futaki .................. H04W 16/28 |
| 2020/0389847 | A1* | 12/2020 | Deng .................... H04W 76/28 |
| 2021/0028853 | A1* | 1/2021 | Wu ....................... H04B 7/0626 |
| 2022/0070026 | A1* | 3/2022 | Chavva .............. H04L 27/2695 |

FOREIGN PATENT DOCUMENTS

| | | | |
|---|---|---|---|
| EP | 3544218 A1 * | 9/2019 | .......... H04B 7/0617 |
| WO | 2016/045509 A1 | 3/2016 | |
| WO | 2016/086144 A1 | 6/2016 | |
| WO | 2016/095688 A1 | 6/2016 | |
| WO | 2016114552 A1 | 7/2016 | |
| WO | WO2020085808 A1 * | 4/2020 | |

OTHER PUBLICATIONS

M. A. M. Al-Shibly, M. H. Habaebi and J. Chebil, "Carrier aggregation in Long Term Evolution—Advanced," 2012 IEEE Control and System Graduate Research Colloquium, 2012, pp. 154-159, doi: 10.1109/ICSGRC.2012.6287153. (Year: 2012).*
"General aspects for NR HF cell", Huawei, HiSilicon, 3GPP TSG-RAN Meeting #95, R2-165585, Aug. 22-26, 2016, 4 pages, Gothenburg, Sweden.
"Beam-based aspects for New Radio", InterDigital Communications, 3GPP TSG-RAN WG2#94, R2-164121, May 23-27, 2016, 4 pages, Nanjing, China.
"On beam sweeping and its implications", Nokia, Alcatel-Lucent Shanghai Bell, 3GPP TSG-RAN WG2 Meeting #94, R2-163443, May 23-27, 2016, 4 pages, Nanjing, China.
"Definitions supporting beam related procedures", Nokia, Qualcomm, CATT, Intel, NTT DoCoMo, Mediatek, Ericsson, ASB, Samsung, LG, 3GPP TSG RAN WG1 Meeting #86, R1-168468, Aug. 22-26, 2016, 3 pages, Gothenburg, Sweden.
International Search Report for PCT/JP2017/018330 dated Jul. 11, 2017 (PCT/ISA/210).
Communication dated Nov. 12, 2019, from the Japanese Patent Office in counterpart Application No. 2018-541887.
'Cell' Concept in NR, Mediatek Inc., 3GPP TSG RAN WG2 Meeting #95, R2-164897, Aug. 22-26, 2016, 4 pages, Gothenburg, Sweden.
"Mobility and beam support in NR", Intel Corporation, 3GPP TSG RAN WG2 Meeting #94, R2-163579, May 23-27, 2016, pp. 1-7, Nanjing, China.
"Carrier Aggregation between carriers of different air interface numerologies", Nokia, Alcatel-Lucent Shanghai Bell, 3GPP TSG-RAN WG2 Meeting #95, R2-164788, Aug. 22-26, 2016, 4 pages, Gothenburg, Sweden.
Interdigital Communications, "Architecture-related Aspects for Interworking between NR and LTE", 3GPP TSG-RAN WG2 #93bis, R2-162786, Dubrovnik, Croatia, Apr. 11-15, 2016, pp. 1-5 (5 pages total).
"Beam Management", MediaTek Inc., 3GPP TSG RAN WG2 Meeting #95, R2-164898, Aug. 22-26, 2016, 4 pages, Gothenburg, Sweden.
"Beam Terminology", Nokia, Alcatel-Lucent Shanghai Bell, 3GPP TSG-RAN WG2 Meeting #94, R2-163437, May 23-27, 2016, 3 pages, Nanjing, China.
"Use cases and RAN2 issues of beam tracking in a beamforming based high frequency NR", Samsung, 3GPP TSG-RAN WG2 Meeting #94, R2-163712, May 23-27, 2016, 5 pages, Nanjing, China.
Communication dated Jul. 24, 2019 from the European Patent Office in counterpart European Application No. 17855252.7.
"3rd Generation Partnership Project; Technical Specification Group Radio Access Network; Study on New Radio Access Technology; Radio Interface Protocol Aspects (Release 14)", 3GPP TR 38.804 V0.3.0, Aug. 2016, pp. 1-21.
"Aggregation of carriers in NR", Ericsson, 3GPP TSG-RAN WG2 Meeting #95, Tdoc R2-165328, Aug. 22-26, 2016, pp. 1-4, Gothenburg, Sweden.
"Beam management in NR", Nokia, Alcatel-Lucent Shanghai Bell, 3GPP TSG-RAN WG2 Meeting #94, R2-163476, May 23-27, 2016, 4 pages, Nanjing, China.
Communication dated Oct. 27, 2020, from the Japanese Patent Office in application No. 2020-014258.
Communication dated Oct. 27, 2020, from the European Patent Office in application No. 20190990.0.
"Discussion on LTE-NR aggregation", NTT DOCOMO, Inc., 3GPP TSG-RAN WG2 Meeting #94, R2-163702, May 23-27, 2016, (3 pages total).
"Beam management in NR",ASUSTeK, 3GPP TSG-RAN WG2 Meeting #95, R2-165287, Aug. 22-26, 2016, (3 pages).

(56) References Cited

OTHER PUBLICATIONS

Chinese Office Action for CN Application No. 201780060458.8 dated Jul. 26, 2021 with English Translation.
Intel Corporation, "Discussion on RLM for PSCell in dual connectivity", 3GPP TSG-RAN WG1 #85 R1-164121, May 27, 2016, China.
Xinwei, "Discussion on DMRS based Open Loop Transmission", 3GPP TSG RAN WG1 Meeting #85 R1-164898, May 27, 2016, China.
Japanese Office Action for JP Application No. 2021-082215 dated Apr. 26, 2022 with English Translation.
MediaTek Inc., Mobility Supporting for HF-NR, 3GPP TSG-RAN WG2#94 R2-163484, May 13, 2016.
Ericsson, Active Mode Mobility in NR: SINR drops in higher frequencies, 3GPP TSG-RAN WG2#93bis R2-162762, Apr. 2, 2016.

* cited by examiner

METHOD AND APPARATUSES FOR SELECTING BEAM IN CARRIER AGGREGATION

CROSS REFERENCE TO RELATED APPLICATIONS

This application is a continuation of U.S. application Ser. No. 16/337,038, filed Mar. 27, 2019, which is a national stage of PCT/JP2017/018330 filed May 16, 2017, claiming priority from Japanese Application No. 2016-192329, filed Sep. 29, 2016, the disclosures of which are incorporated herein by reference in their entirety.

TECHNICAL FIELD

The present disclosure relates to radio communication and, in particular, to radio communication that uses directional beams.

BACKGROUND ART

The 3rd Generation Partnership Project (3GPP) has started to work on the standardization for the fifth generation mobile communication system (5G), i.e., 3GPP Release 14, in 2016 to make 5G a commercial reality in or after 2020. 5G is expected to be realized by a combination of continuous enhancement/evolution of LTE and LTE-Advanced and an innovative enhancement/evolution by an introduction of a new 5G air-interface (i.e., a new Radio Access Technology (RAT)). The new RAT supports, for example, frequency bands higher than the frequency bands (e.g., 6 GHz or lower) supported by the continuous evolution of LTE/LTE-Advanced. For example, the new RAT supports centimeter-wave bands (10 GHz or higher) and millimeter-wave bands (30 GHz or higher).

In this specification, the fifth generation mobile communication system is also referred to as a Next Generation (NextGen) System (NG System). A new RAT for the NG System is referred to as a New Radio (NR), 5G RAT, or NG RAT. A new radio access network (RAN) and a core network for the NG system are referred to as a NextGen RAN (NG RAN) or a New RAN, and a NextGen Core (NG Core), respectively. A radio terminal (User Equipment (UE)) capable of being connected to the NG System is referred to as a NextGen UE (NG UE). A base station that supports the New Radio (NR) is referred to as an NG NodeB (NG NB), an NR NodeB (NR NB), or a gNB. The names of the RAT, UE, radio access network, core network, network entities (nodes), protocol layers and the like for the NG System will be determined in the future as standardization work progresses.

Further, the term "LTE" used in this specification includes enhancement/evolution of LTE and LTE-Advanced to provide interworking with the NG System, unless otherwise indicated. Such enhancement/evolution of LTE and LTE-Advanced for interworking with the NG System is also referred to as LTE-Advanced Pro, LTE+, or enhanced LTE (eLTE). Further, the terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW)" include these enhancement/evolution to provide interworking with the NG System, unless otherwise indicated. The enhanced EPC, MME, S-GW, and P-GW are also referred to as, for example, enhanced EPC (eEPC), enhanced MME (eMME), enhanced S-GW (eS-GW), and enhanced P-GW (eP-GW).

As described above, the NG system supports higher frequency bands (e.g., 6 GHz or higher). In order to provide required coverage on these higher frequency bands, higher antenna gain is required to compensate for path loss. Meanwhile, since the size of an antenna element becomes smaller as the wavelength becomes higher, a multi-antenna system using an extremely large number of antenna elements (e.g., several hundreds of antenna elements) can be implemented in a practical size in higher frequency bands. Accordingly, in the NG System, larger antenna arrays are used to form high gain beams. The beam means a radiation pattern at least having several levels of directivity. High gain beams are narrower than wide sector beams used in lower frequency bands (e.g., current LTE bands (6 GHz or lower)). Accordingly, multiple beams are needed to cover a required cell area.

NR NB may use a plurality of Transmission and Reception Points (TRPs). A TRP means a physical location for transmission and reception of radio signals. TRPs may be arranged in a centralized manner or in a distributed manner. Each TRP may form multiple beams. The TRP may also be referred to as a remote radio head (RRH).

Several proposals regarding beam-related procedures in the NR system have been made (e.g., see Non-Patent Literature 1-6). The beam-related procedures include mobility (procedure) and beam management (procedure) (Non-Patent Literature 6). The beam management is a set of layer 1 (L1)/layer 2 (L2) procedures to acquire and maintain TRP(s) and/or UE beams that can be used for downlink (DL) and uplink (UL) transmission/reception. The beam management at least includes beam determination, beam measurement, beam reporting, and beam sweeping. The beam determination is a procedure for TRP(s) or UE to select its own transmission (Tx)/reception (Rx) beam(s). The beam measurement is a procedure for TRP(s) or UE to measure characteristics of received beamformed signals. The beam reporting is a procedure for UE to report information regarding beamformed signal(s) based on the beam measurement. The beam sweeping is an operation for covering a spatial area with beams transmitted and/or received during a time interval in a predetermined way.

Further, it is assumed that the NR uses different sets of radio parameters for a plurality of frequency bands. For example, subcarrier spacing, symbol length, Transmission Time Interval (TTI), and subframe duration are different for frequency bands. These set of radio parameters are referred to as numerologies. In the NG system, the UE and the NR NB support aggregation of multiple NR carriers with different numerologies. The 3GPP has studied achievement of the aggregation of multiple NR carriers with different numerologies by lower layer aggregation, such as existing LTE Carrier Aggregation (CA), or higher layer aggregation, such as existing Dual Connectivity (e.g., see Non-Patent Literature 7-9).

CITATION LIST

Non-Patent Literature

[Non-Patent Literature 1] 3GPP technical document R2-163437, Nokia, Alcatel-Lucent Shanghai Bell, "Beam Terminology", 3GPP TSG-RAN WG2 Meeting #94, Nanjing, China, 23-27 May 2016

[Non-Patent Literature 2] 3GPP technical document R2-163443, Nokia, Alcatel-Lucent Shanghai Bell, "On beam sweeping and its implications", 3GPP TSG-RAN WG2 Meeting #94, Nanjing, China, 23-27 May 2016
[Non-Patent Literature 3] 3GPP technical document R2-163476, Nokia, Alcatel-Lucent Shanghai Bell, "Beam management in NR", 3GPP TSG-RAN WG2 Meeting #94, Nanjing, China, 23-27 May 2016
[Non-Patent Literature 4] 3GPP technical document R2-163579, Intel Corporation, "Mobility and beam support in NR", 3GPP TSG-RAN WG2 Meeting #94, Nanjing, China, 23-27 May 2016
[Non-Patent Literature 5] 3GPP technical document R2-163712, Samsung, "Use cases and RAN2 issues of beam tracking in a beamforming based high frequency NR", 3GPP TSG-RAN WG2 Meeting #94, Nanjing, China, 23-27 May 2016
[Non-Patent Literature 6] 3GPP technical document R1-168468, Nokia, Qualcomm, CATT, Intel, NTT DoCoMo, Mediatek, Ericsson, ASB, Samsung, LG, "Definitions supporting beam related procedures", 3GPP TSG RAN WG1 Meeting #86, Gothenburg, Sweden, 22-26 Aug. 2016
[Non-Patent Literature 7] 3GPP TR 38.804 V0.3.0 (2016-08) "3rd Generation Partnership Project; Technical Specification Group Radio Access Network; Study on New Radio Access Technology; Radio Interface Protocol Aspects (Release 14)", August 2016
[Non-Patent Literature 8] 3GPP technical document R2-164788, Nokia, Alcatel-Lucent Shanghai Bell, "Carrier Aggregation between carriers of different air interface numerologies", 3GPP TSG-RAN WG2 Meeting #95, Gothenburg, Sweden, 22-26 Aug. 2016
[Non-Patent Literature 9] 3GPP technical document R2-165328, "Aggregation of carriers in NR", 3GPP TSG-RAN WG2 Meeting #95, Gothenburg, Sweden, 22-26 Aug. 2016

SUMMARY OF INVENTION

Technical Problem

The inventor has studied UE mobility between beams and found some problems. One of the objects to be attained by embodiments disclosed herein is to provide an apparatus, a method, and a program that contribute to provision of a procedure for UE mobility between beams. It should be noted that this object is merely one of the objects to be attained by the embodiments disclosed herein. Other objects or problems and novel features will be made apparent from the following description and the accompanying drawings.

Solution to Problem

In a first aspect, a radio terminal includes a wireless transceiver and at least one processor. The wireless transceiver is configured to transmit signals to a base station and receive signals from the base station. The at least one processor is configured to receive beam configuration information from the base station, and to measure a first plurality of transmission beams transmitted from the base station in accordance with the beam configuration information. The at least one processor is further configured to use, as a first serving beam for transmission from the base station to the radio terminal, one or more beams selected from among the first plurality of transmission beams based on a measurement result of the first plurality of transmission beams. Each of the first plurality of transmission beams carries a beamformed reference signal to be measured by the radio terminal. The beam configuration information includes reference signal configuration indicating a radio resource used on each beam for transmitting the beamformed reference signal.

In a second aspect, a base station includes a wireless transceiver and at least one processor. The wireless transceiver is configured to transmit signals to a radio terminal and receive signals from the radio terminal. The at least one processor is configured to transmit beam configuration information to the radio terminal. The at least one processor is further configured to use, as a first serving beam for transmission from the base station to the radio terminal, one or more beams selected from among a first plurality of transmission beams transmitted from the base station based on a result of a measurement by the radio terminal of the first plurality of transmission beams. Each of the first plurality of transmission beams carries a beamformed reference signal to be measured by the radio terminal. The beam configuration information includes reference signal configuration indicating a radio resource used on each beam for transmitting the beamformed reference signal.

In a third aspect, a method performed by a radio terminal includes: (a) receiving beam configuration information from a base station; (b) measuring a first plurality of transmission beams transmitted from the base station in accordance with the beam configuration information; and (c) using, as a first serving beam for transmission from the base station to the radio terminal, one or more beams selected from among the first plurality of transmission beams based on a measurement result of the first plurality of transmission beams. Each of the first plurality of transmission beams carries a beamformed reference signal to be measured by the radio terminal. The beam configuration information includes reference signal configuration indicating a radio resource used on each beam for transmitting the beamformed reference signal.

In a fourth aspect, a method performed by a base station includes: (a) transmitting beam configuration information to a radio terminal; and (b) using, as a first serving beam for transmission from the base station to the radio terminal, one or more beams selected from among a first plurality of transmission beams transmitted from the base station based on a result of a measurement by the radio terminal of the first plurality of transmission beams. Each of the first plurality of transmission beams carries a beamformed reference signal to be measured by the radio terminal. The beam configuration information includes reference signal configuration indicating a radio resource used on each beam for transmitting the beamformed reference signal.

In a fifth aspect, a program includes instructions (software codes) that, when loaded into a computer, cause the computer to perform the method according to the above-described third or fourth aspect.

Advantageous Effects of Invention

According to the above-deceived aspects, it is possible to provide an apparatus, a method, and a program capable of contributing to provision of a procedure for UE mobility between beams.

DESCRIPTION OF EMBODIMENTS

Figure 1:
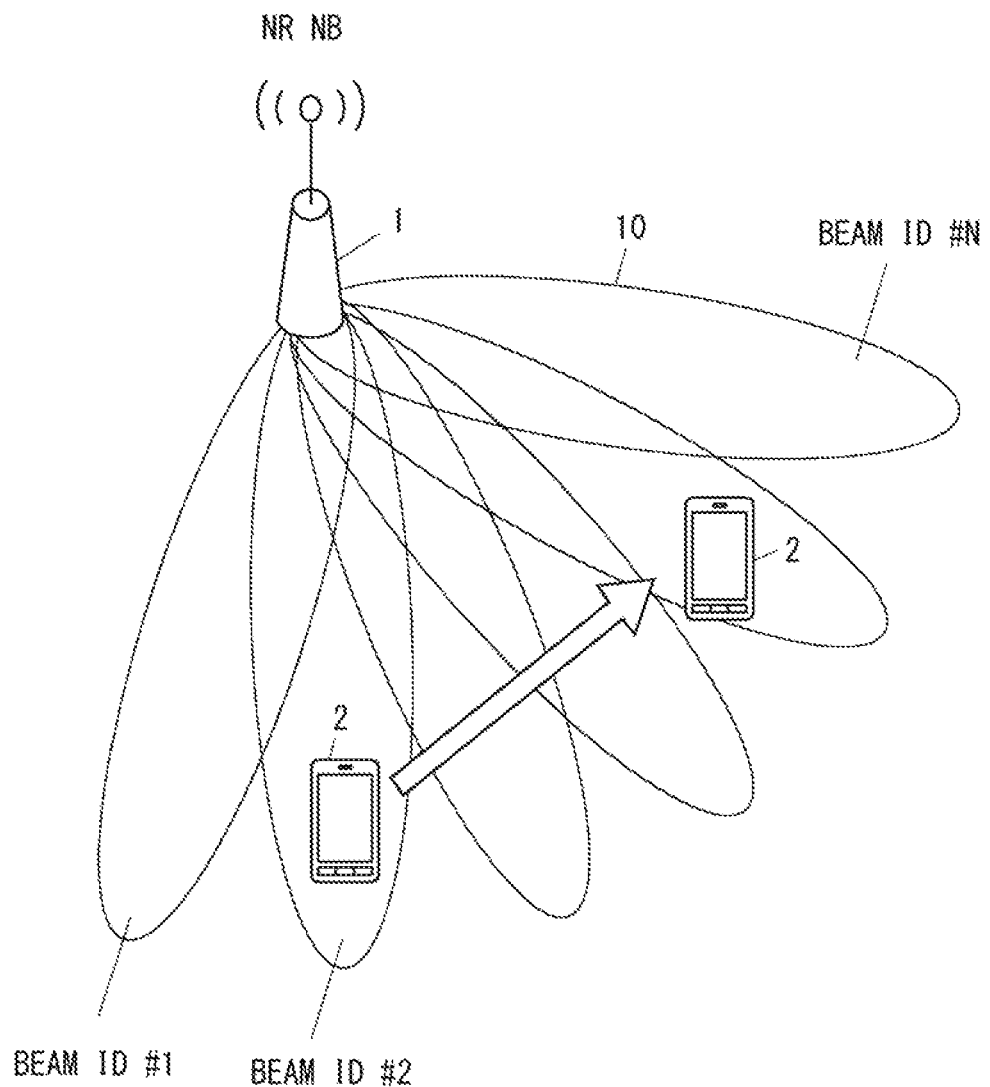
FIG. 1 is a diagram showing a configuration example of a radio communication network and one example of beam level mobility according to one embodiment of the present disclosure.

Specific embodiments are described hereinafter in detail with reference to the drawings. The same or corresponding elements are denoted by the same reference symbols throughout the drawings, and repetitive descriptions are omitted as necessary for clarity.

Each of the embodiments described below may be used individually, or two or more of the embodiments may be appropriately combined with one another. These embodiments include novel features different from one another. Accordingly, these embodiments contribute to achieving objects or solving problems different from one another and contribute to obtaining advantages different from one another.

First Embodiment

FIGS. 1-4 are diagrams showing several configuration examples of a radio communication network and several examples of beam level mobility according to this embodiment. In the example shown in FIG. 1, the radio communication network includes a New Radio (NR) base station (i.e., NR NodeB (NR NB)) 1 and a radio terminal (UE) 2. The NR NB 1 forms a plurality of transmission beams 10, and transmits a beamformed reference signal (RS) on each of the transmission beams. In other words, each of the transmission beams 10 carries the beamformed reference signal. The beamformed reference signal may also be referred to as a beam-specific reference signal (BRS). The beamformed reference signal may be a pre-coded Channel State Information (CSI) reference signal CSI-RS). The beamformed reference signal may be UE-specific or may be non-UE-specific.

The plurality of transmission beams 10 are specified by beam identifiers (beam IDs). In other words, the transmission beams 10 are distinguished from one another by different beam IDs. The beam ID may also be referred to as a beam index. The beamformed reference signal may contain a beam identifier. Alternatively, the beam ID may be specified by a radio resource or resources (e.g., a subcarrier, a time slot, a resource block, a spreading code, or any combination thereof) used for transmitting the beamformed reference signal, or by an index associated with the radio resource or resources. In a case where one TRP forms only one transmission beam, the beam identifier may be a TRP identifier (TRP ID). In other words, in place of the beam identifiers, TRP identifiers may be used to distinguish the transmission beams 10 from one another.

The plurality of beam IDs of the plurality of transmission beams 10 may be associated with the same cell identifier provided by the NR NB 1 (e.g., E-UTRAN Cell Global ID (ECGI), Physical Cell Identifier (PCI)). In other words, the plurality of transmission beams 10 that cover the same cell may be associated with the same cell identifier.

The UE 2 receives beam configuration information from the NR NB 1 in any one of the cells managed by the NR NB 1, and measures the plurality of transmission beams 10 of the NR NB 1 in accordance with the beam configuration information. The beam configuration information includes reference signal configuration indicating a radio resource used on each transmission beam 10 for transmitting the beamformed reference signal. The NR NB 1 and the UE 2 use, as a serving beam for transmission from the NR NB 1 to the UE 2, one or more beams selected from among the plurality of transmission beams 10 based on measurement results of the plurality of transmission beams by the UE 2. The selection (or determination) of the serving beam based on the measurement results of the plurality of transmission beams by the UE 2 may be performed by the UE 2 or by the NR NB 1.

For example, the NR NB 1 may transmit, in a cell of a lower frequency band in which beamforming is not performed or a wide sector beam is used, the beam configuration information regarding the transmission beams 10 of another cell of a higher frequency band. The cell of the lower frequency band may be an (e)LTE macro cell and may be used to maintain control connection between the NR NB 1 and the UE 2. Alternatively, the beam configuration information may be transmitted from the NR NB 1 to the UE 2 on a serving beam that has already been selected (or configured). The beam configuration information transmitted on the serving beam may be used for a measurement of this serving beam and also used for a measurement and (re) selection of another transmission beam.

The beam configuration information may include a beam configuration set information element (IE). The beam configuration information may be included in any system information (System Information Block (SIB)) broadcasted by the NR NB 1, or may be sent to the UE 2 via dedicated Radio Resource Control (RRC) signaling. Alternatively, in a case where the UE 2 has beamforming functionality according to this embodiment and the NR NB 1 supports (or activates) this beamforming functionality in a serving cell of the UE 2, the UE 2 may request the NR NB 1 to transmit the beam configuration information. In response to the request from the UE 2, the NR NB 1 may broadcast the beam configuration information, or may transmit the beam configuration information to the UE 2 via dedicated RRC signaling.

The beam configuration information may further include a beam identifier (e.g., beam ID, TRP ID). The beam configuration information may include an area configuration that corresponds to each beam or to a TRP (or RRH) used for transmission of each beam. The area configuration may indicate a geographical area (e.g., a zone, a beam area, a predefined partial area of a cell (or cell portion)) associated with the beam identifier. The area configuration may include information regarding latitude and longitude as information indicating the geographical area.

In a case where the UE 2 performs beam selection (or beam determination), the beam configuration information may include a beam selection criterion (or beam determination criterion). The beam selection criterion may include, for example, a threshold or an offset to be applied to a reception quality of the beamformed reference signal obtained by the beam measurement. The reception quality is, for example, received signal strength (e.g., Reference Signal Received Power (RSRP)), received signal quality (e.g., Reference Signal Received Quality (RSRQ), Signal to Noise Ratio (SNR), or Signal to Interference-pulse-Noise Ratio (SINR)).

In a case where the NR NB 1 performs the beam selection, the beam configuration information may include a beam reporting criterion. The beam reporting criterion may include, for example, a threshold or an offset to be applied to a reception quality (e.g., received signal strength, SNR, or SINR) of the beamformed reference signal, which is obtained by the beam measurement.

The beam configuration information may include beam subframe configuration information regarding a beam pattern. In higher frequency bands, the number of beams that the NR NB 1 can simultaneously transmit may be smaller than the number of beams needed to cover a required cell area. In this case, the NR NB 1 may perform beam sweeping to cover the required cell area. More specifically, the NR NB 1 sweeps the cell area in the time domain by sequentially activating each of the multiple beam sets that cover different areas in the cell. The beam set here means one or a plurality of transmission beams 10 formed simultaneously by the NR NB 1.

The beam subframe configuration information may include configuration information for beam sweeping by the NR NB 1 (beam sweeping configuration). The beam sweeping configuration information may include a beam sweeping pattern in a time domain. The beam sweeping pattern may be indicated, for example, by a bit map format associated with one or any combination of: an OFDM symbol; a slot consisting of OFDM symbols; a subframe; and a frame. For example, "1" (or "0") in the bit map may indicate that signals are transmitted using the corresponding transmission beam.

The beam subframe configuration information may include information regarding a beam pattern in the frequency domain, in addition to or in place of the beam sweeping in the time domain. For example, one beam set may be associated with a plurality of frequency resources (e.g., subcarrier, Physical Resource Block (PRB), or sweeping block). That is, signals may be transmitted using different beams on different pluralities of frequency resources. One sweeping block covers a specific area in a cell using one active beam.

Figure 2:
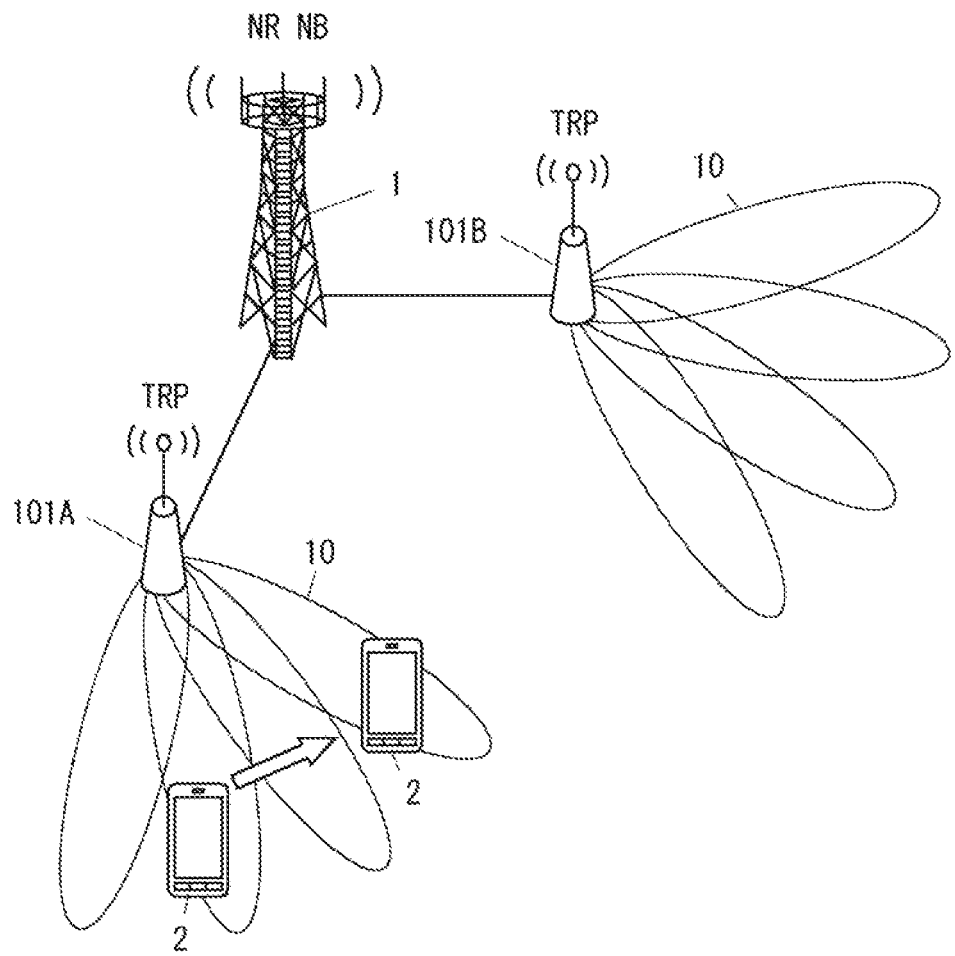
FIG. 2 is a diagram showing a configuration example of a radio communication network and one example of beam level mobility according to one embodiment of the present disclosure.

In the example shown in FIG. 2, the NR NB 1 uses a plurality of TRPs 101A and 101B. Each TRP 101 forms one or more transmission beams 10. In the example shown in FIG. 2, the UE 2 moves among transmission beams 10 within one TRP 101. In the example shown in FIG. 2, the beam configuration information may include configurations regarding a plurality of transmission beams 10 in one TRP 101.

Figure 3:
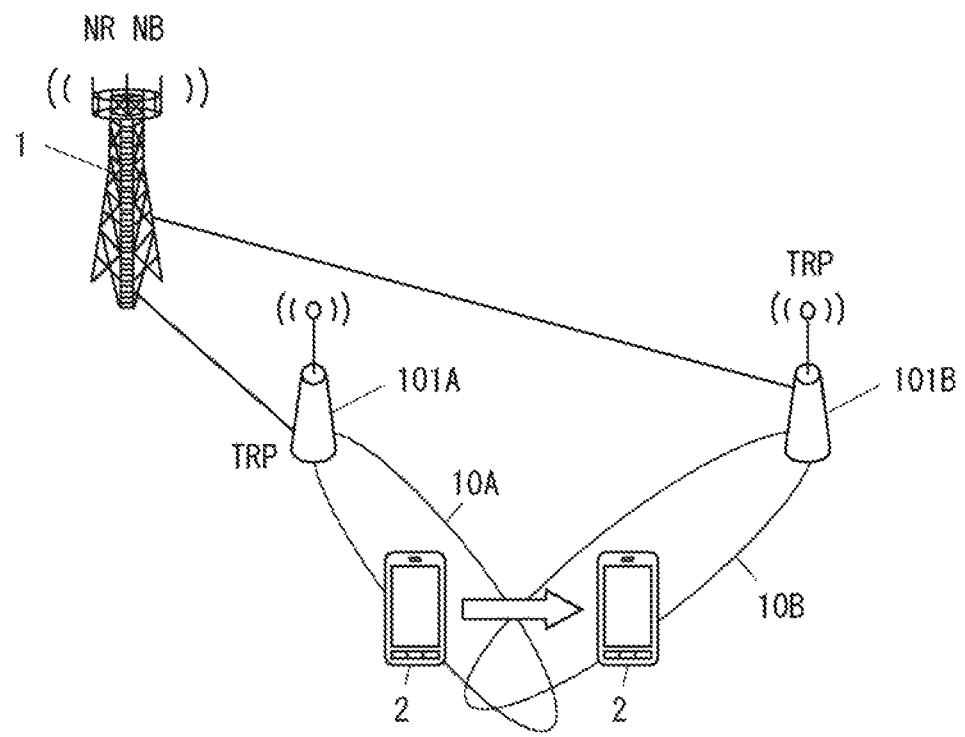
FIG. 3 is a diagram showing a configuration example of a radio communication network and one example of beam level mobility according to one embodiment of the present disclosure.

In the example shown in FIG. 3, the NR NB 1 uses a plurality of TRPs 101A and 101B. Each TRP forms one or more transmission beams 10. In the example shown in FIG. 3, the UE 2 moves from a transmission beam 10A formed by the TRP 101A to a transmission beam 10B formed by the TRP 101B. In the example shown in FIG. 3, the beam configuration information may include configurations regarding one or more transmission beams 10 formed by each TRP 101 managed by the NR NB 1.

Figure 4:
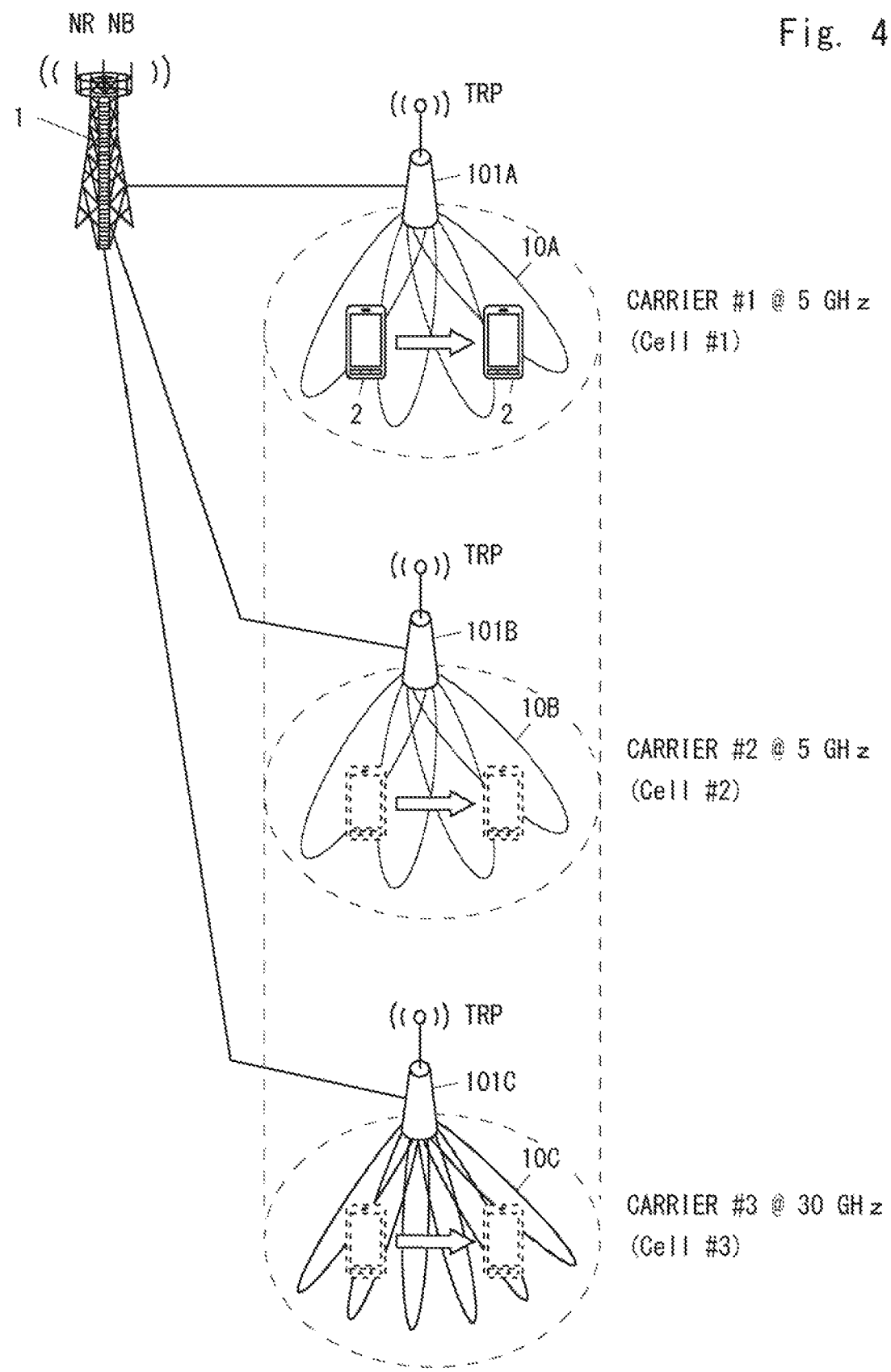
FIG. 4 is a diagram showing a configuration example of a radio communication network and one example of beam level mobility according to one embodiment of the present disclosure.

In the example shown in FIG. 4, the NR NB 1 provides a plurality of carriers (i.e., carriers #1, #2, and #3) using a plurality of TRPs 101. In the example shown in FIG. 4, the coverages of the three carriers #1, #2, and #3 are hierarchically formed in substantially the same geographical area. The UE 2 supports aggregation of these carriers. The carriers provided by the NR NB 1 may belong to different frequency bands and may use different numerologies (e.g., subcarrier spacing, symbol length, Transmission Time Interval (TTI), and subframe duration). In the example shown in FIG. 4, the TRP 101A operates the carrier #1 (i.e., cell #1) in the 5 GHz band and forms a plurality of transmission beams 10A in the carrier #1. The TRP 101B operates the carrier #2 (i.e., cell #2) in the 5 GHz band and forms a plurality of transmission beams 10B in the carrier #2. Meanwhile, the TRP 101C operates the carrier #3 (i.e., cell #3) in the 30 GHz band and forms a plurality of transmission beams 10C in the carrier #3. As already described above, in order to provide a desired coverage in higher frequency bands, a high antenna gain is required to compensate for the path loss. In order to allow the carrier #3 in the 30 GHz band to cover the same cell area as the carriers #1 and #2 in the 5 GHz band, the beam width of the transmission beams 10C in the 30 GHz band is narrower than the beam width of the transmission beams 10A and 10B in the 5 GHz band.

In the example shown in FIG. 4, the UE 2 or the NR NB 1 may perform beam selection on a carrier-by-carrier basis, that is, within each carrier. More specifically, the UE 2 or the NR NB 1 may perform serving beam selection from the plurality of transmission beams in the carrier #1, serving beam selection from the plurality of transmission beams in the carrier #2, and serving beam selection from the plurality of transmission beams in the carrier #3 independently from one another. Alternatively, the UE 2 or the NR NB 1 may perform beam selection on a per-predefined carrier set basis, that is, within a carrier set. The carrier set may be a plurality of carriers belonging to the same frequency band (e.g., the carriers #1 and carrier #2). Alternatively, the carrier set may be a plurality of carriers in which the same numerology is used. Alternatively, the carrier set may be a plurality of carriers in which a plurality of numerologies handled in a similar way based on a predetermined criterion are used. In the example shown in FIG. 4, the beam configuration information may include configuration regarding one or more transmission beams 10 formed by each TRP 101 managed by the NR NB 1.

Figure 5:
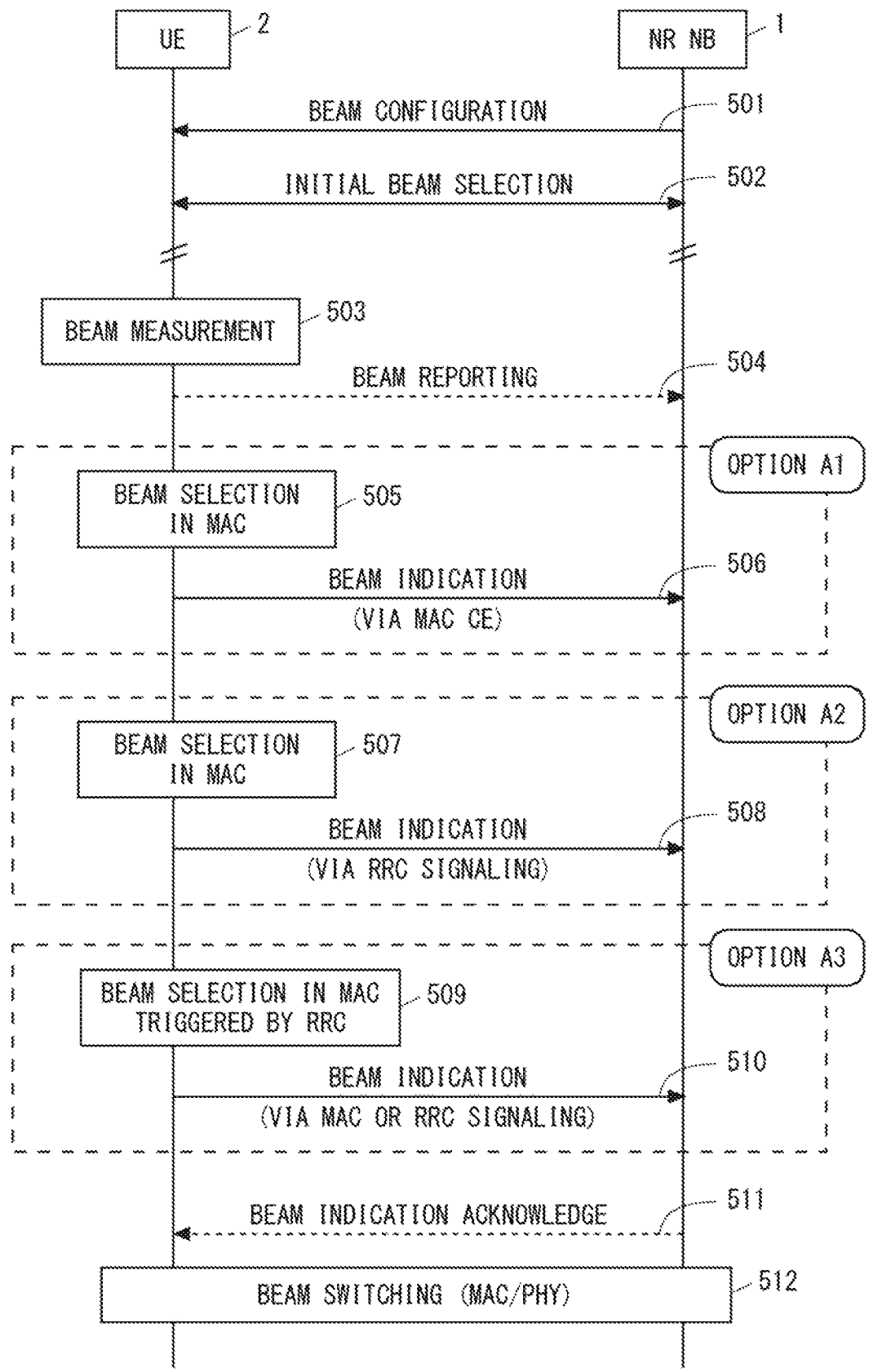
FIG. 5 is a sequence diagram showing one example of a procedure for UE mobility between beams according to one embodiment of the present disclosure.

FIG. 5 is a sequence diagram showing one example of a procedure for UE mobility between beams. In the example shown in FIG. 5, the UE 2 selects a serving beam. In Step 501, the NR NB 1 transmits a beam configuration to the UE 2. In Step 502, the NR NB 1 and the UE 2 perform initial beam selection. In the initial beam selection, the NR NB 1 may assign an initial serving beam for the UE 2. Alternatively, the UE 2 may select an initial serving beam in a manner similar to the below-described beam (re)selection.

In Step 503, the UE 2 performs measurement of transmission beams transmitted from the NR NB 1 in accordance with the beam configuration. Specifically, the UE 2 attempts to receive one or more beamformed reference signals that respectively correspond to one or more transmission beams assigned in the beam configuration, and measures a reception quality of each received beamformed reference signal. The UE 2 may measure received signal strength, SNR, or SINR of each beamformed reference signal.

In Step 504, the UE 2 sends a beam reporting to the NR NB 1. The beam reporting includes beam information based on the measurement results in Step 503. In one example, this beam information may indicate the reception qualities of all the beamformed reference signals measured by the UE 2. Alternatively, this beam information may indicate one or combination of the reception quality and the beam ID of the beamformed reference signal at which the reception quality measured by the UE 2 exceeds a threshold. Since the UE 2 selects a serving beam in the example shown in FIG. 5, the beam reporting in Step 504 may be omitted.

Next, the UE 2 and the NR NB 1 perform Option A1 (i.e., Steps 505 and 506), Option A2 (i.e., Steps 507 and 508), or Option A3 (i.e., Steps 509 and 510) shown in FIG. 5.

In Option A1, the RRC layer is not involved in the beam selection, and the Medium Access Control (MAC) sublayer of the UE 2 performs the beam selection. Specifically, in Step 505, the MAC sublayer of the UE 2 selects a serving beam. The UE 2 may select a serving beam based on a beam selection criterion included in the beam configuration received in Step 501. As already described above, the beam selection criterion may include a threshold or an offset applied to the reception quality of the beamformed reference signal. For example, when the reception quality of the beamformed reference signal of one transmission beam is larger than the reception quality of the beamformed reference signal of the current serving beam by more than a predetermined threshold, the UE 2 may select this transmission beam as a new serving beam. In Step 506, the UE 2 transmits to the NR NB 1 a MAC layer message (e.g., beam indication message) indicating the serving beam newly selected by the UE 2. This MAC layer message is processed by the MAC sublayer of the NR NB 1. This MAC layer message may be a MAC Control Element (CE).

In Option A2, the MAC sublayer of the UE 2 performs the beam selection, and the RRC layer of the UE 2 notifies the NR NB 1 of the selected beam. Specifically, in Step 507, the MAC sublayer of the UE 2 selects a serving beam. The processing in Step 507 may be similar to that in Step 505 described above. In Step 508, the UE 2 notifies the NR NB 1 of the serving beam, newly selected by the UE 2, via RRC signaling.

In Option A3, the RRC layer of the UE 2 triggers the MAC sublayer of the UE 2 to perform beam selection, and the RRC layer or MAC sublayer of the UE 2 notifies the NR NB 1 of the selected beam. Specifically, in Step 509, the MAC sublayer of the UE 2 performs the serving beam selection processing triggered by the RRC layer of the UE 2. In Step 510, the UE 2 notifies the NR NB 1 of the serving beam, newly selected by the UE 2, via RRC signaling or via a MAC sublayer message (e.g., MAC CE).

In Step 511, the NR NB 1 transmits a response message (e.g., beam indication acknowledge message) to the UE 2 in response to receiving the beam indication message in Step 506, 508, or 510. The transmission of the response message in Step 511 may be omitted.

In Step 512, the UE 2 and the NR NB 1 switch the serving beam for transmission from the NR NB 1 to the UE 2, from the current beam to the new beam selected by the UE 2. The processing in Step 512 is performed in the MAC sublayer and the physical (PHY) layer. The MAC sublayer of the UE 2 instructs the PHY layer of the UE 2 to switch the serving beam. The switching of the (serving) beam may be expressed as changing of the (serving) beam or modification of the (serving) beam.

Along with the switching of the serving beam in Step 512, one or both of the NR NB 1 and the UE 2 may perform at least one of the operations listed below:
  Random Access Channel (RACH) procedure;
  Power Headroom Report (PHR) transmission by the UE 2;
  Flushing of a soft buffer for Hybrid Automatic Repeat reQuest (HARQ);
  Re-start of HARQ from initial transmission for not-yet-successful data;
  Reset (i.e., stop and re-start from the first) of CSI derivation; and
  Reset or re-start of a timer in the MAC sublayer.

The RACH procedure (or random access procedure) is performed for the beam after the switching, for example, to determine (or adjust) at least one of transmission timing and transmission power of the uplink, or to send a scheduling request (SR) for uplink data transmission. Further, the RACH procedure may be used by the network side (NR NB 1) to recognize that the UE 2 has completed the serving beam switching (or that the UE 2 has moved). The radio resources to be used in the RACH procedure (e.g., RACH preamble, time/frequency PRACH resource, beam configuration) may be indicated in advance by the NR NB 1 to the UE 2 via the beam configuration information. Alternatively, without performing the RACH procedure, the UE 2 or the NR NB 1 may determine (or adjust) the transmission timing of uplink signals by calculating it from the timing adjustment value before switching (i.e., Timing Advance) on the basis of the relation between the beam before the switching and the beam after the switching. Instead, the timing adjustment value (TA), or the configuration, after the beam switching may be the same as that before the beam switching.

The transmission of a PHR is performed, for example, to determine (or adjust) the uplink transmission power for the beam after the switching. The UE 2 may trigger a PHR when the beam has been switched. In addition or alternatively, the UE 2 may determine whether to transmit a PHR depending on whether the value of the propagation loss (or path loss) has been changed by an amount greater than a predetermined threshold specified by the NR NB 1, due to the beam switching.

With regard to flushing of the soft buffer for HARQ, the UE 2 may flush the HARQ soft buffer that has been used before the beam switching when, for example, the beam switching has occurred before the UE 2 completes the reception of downlink (DL) data (or in the middle of receiving the data). Alternatively, the UE 2 may discard information stored in the HARQ soft buffer in response to receiving new DL data using the same HARQ process number (#) as before the switching.

With regard to the reset of CSI derivation, the UE 2 may reset calculation of the Channel Quality Indicator (CQI) for a downlink reference signal (e.g., beamformed RS) when, for example, the UE 2 has performed the beam switching. In this case, the UE 2 may operate so as to derive a valid CQI value within a predetermined period (e.g., n+8, n+24) from the time (e.g., subframe n) when the beam switching has been performed.

With regard to the reset or re-start of a timer in the MAC sublayer, the UE 2 (and the NR NB 1) may reset or re-start the timer in the MAC sublayer when, for example, the UE 2 (and the NR NB 1) has performed (or determined to perform) the beam switching. The timer of in the MAC sublayer includes, for example, at least one of: a timer regarding PHR (e.g., periodicPHR-Timer, prohibitPHR-Timer); a timer regarding Discontinuous Reception (DRX) (e.g., drx-InactivityTimer, drx-RetransmissionTimer); an uplink synchronization timer (i.e. timeAlignmentTimer); a timer regarding a scheduling request (e.g., sr-Prohibit-Timer); and a timer regarding a buffer status report (e.g., periodicBSR-Timer, prohibitBSR-Timer).

Figure 6:
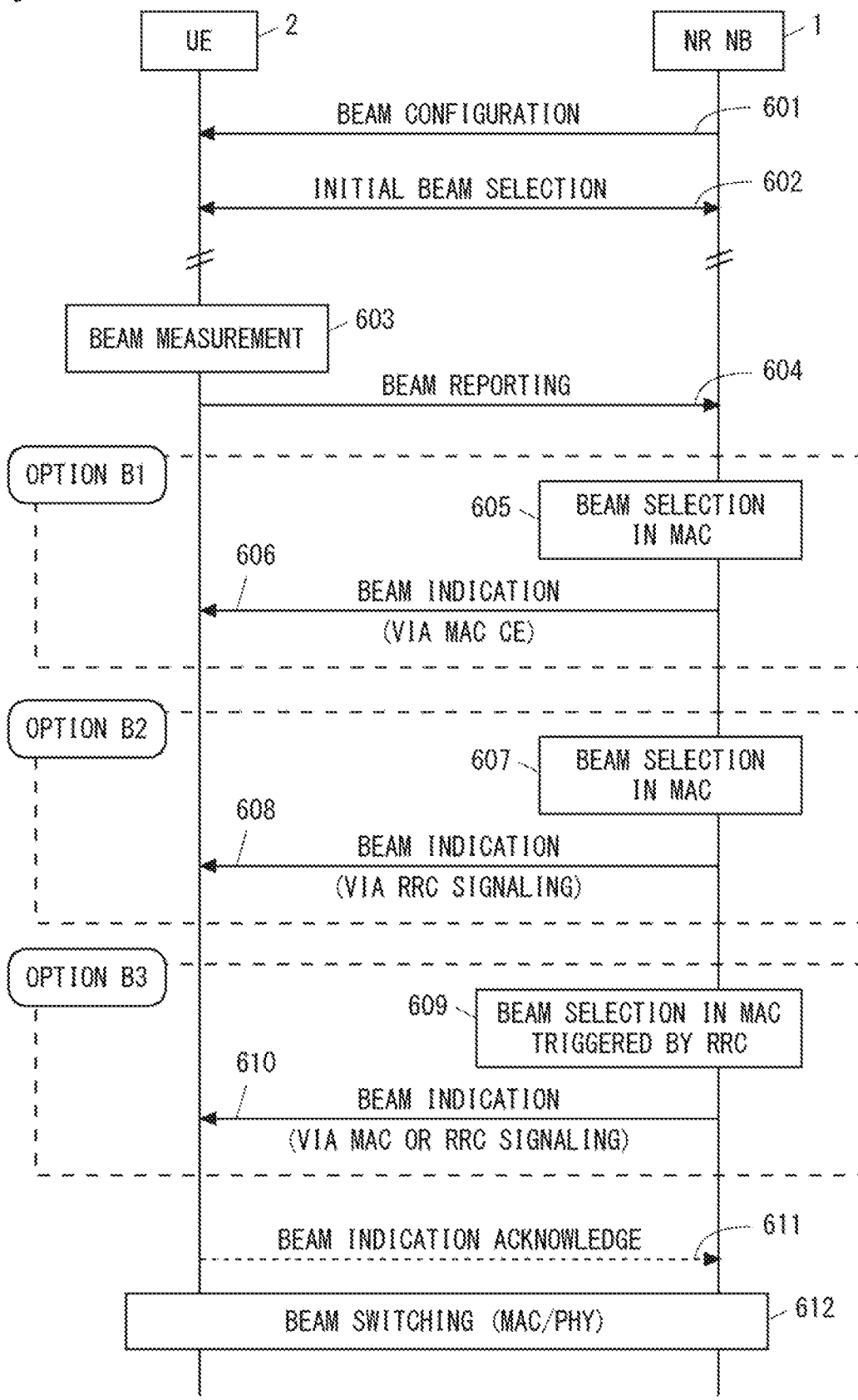
FIG. 6 is a sequence diagram showing one example of the procedure for UE mobility between beams according to one embodiment of the present disclosure.

FIG. 6 is a sequence diagram showing another example of the procedure for UE mobility between beams. In the example shown in FIG. 6, the NR NB 1 selects a serving beam. In Step 601, the NR NB 1 transmits a beam configuration to the UE 2. In Step 602, the NR NB 1 and the UE 2 perform initial beam selection. In the initial beam selection, the NR NB 1 may assign an initial serving beam for the UE 2 in a manner similar to the below-described beam (re)selection. Alternatively, the UE 2 may select an initial serving beam.

In Step 603, the UE 2 performs measurement of transmission beams transmitted from the NR NB 1 in accordance with the beam configuration. In Step 604, the UE 2 sends a beam reporting to the NR NB 1. The processing in Steps 603 and 604 may be similar to the processing in Steps 503 and 504.

Next, the UE 2 and the NR NB 1 perform Option B1 (i.e., Steps 605 and 606), Option B2 (i.e., Steps 607 and 608), or Option B3 (i.e., Steps 609 and 610) shown in FIG. 6.

In Option B1, the RRC layer is not involved in the beam selection, and the MAC sublayer of the NR NB 1 performs the beam selection. Specifically, in Step 605, the MAC sublayer of the NR NB 1 selects a serving beam. For example, when the reception quality of the beamformed reference signal of one transmission beam is larger than the reception quality of the beamformed reference signal of the current serving beam by more than a predetermined threshold, the NR NB 1 may select this transmission beam as a new serving beam. In Step 606, the NR NB 1 transmits to the UE 2 a MAC layer message (e.g., beam indication message) indicating the serving beam newly selected by the NR NB 1. This MAC layer message is processed by the MAC sublayer of the UE 2. This MAC layer message may be a MAC CE.

In Option B2, the MAC sublayer of the NR NB 1 performs the beam selection and the RRC layer of the NR NB 1 notifies the UE 2 of the selected beam. Specifically, in Step 607, the MAC sublayer of the NR NB 1 selects a serving beam. The processing in Step 607 may be similar to the above-described processing in Step 605. In Step 608, the NR NB 1 notifies the UE 2 of the serving beam, newly selected by the NR NB 1, via RRC signaling.

In Option B3, the RRC layer of the NR NB 1 triggers the MAC sublayer of the NR NB 1 to perform beam selection, and the RRC layer or MAC sublayer of the NR NB 1 notifies the UE 2 of the selected beam. Specifically, in Step 609, the MAC sublayer of the NR NB 1 performs the serving beam selection processing triggered by the RRC layer of the NR NB 1. In Step 610, the NR NB 1 notifies the UE 2 of the serving beam, newly selected by the NR NB 1, via RRC signaling or via a MAC sublayer message (e.g., MAC CE).

In Step 611, the UE 2 transmits a response message (e.g., beam indication acknowledge message) to the NR NB 1 in response to receiving the beam indication message in Step 606, 608, or 610. The transmission of the response message in Step 611 may be omitted.

In Step 612, the UE 2 and the NR NB 1 switch the serving beam for transmission from the NR NB 1 to the UE 2 from the current beam to the new beam selected by the NR NB 1. The processing in Step 612 is performed in the MAC sublayer and the physical (PHY) layer. The MAC sublayer of the UE 2 instructs the PHY layer of the UE 2 to switch the serving beam.

Figure 7:
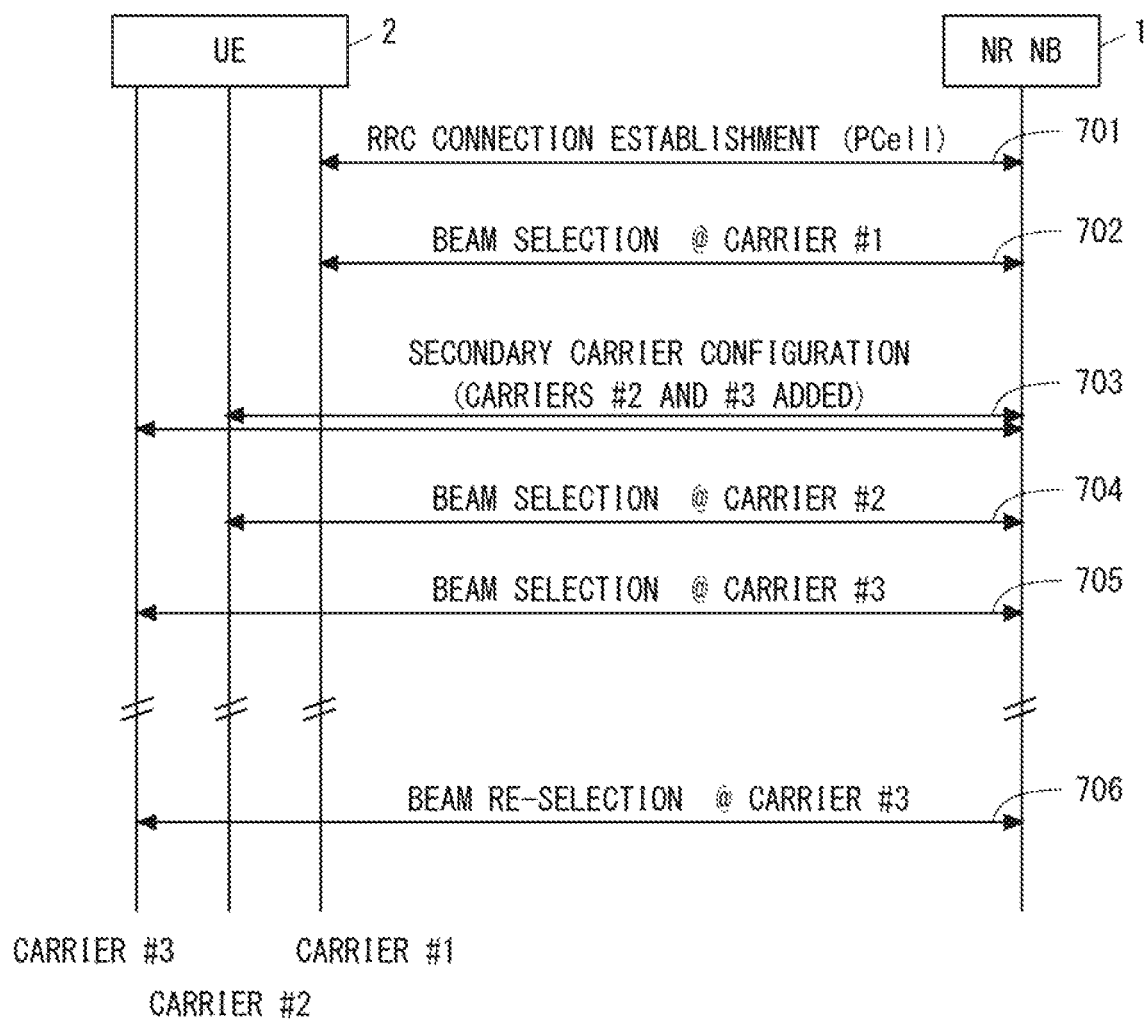
FIG. 7 is a sequence diagram showing one example of the procedure for UE mobility between beams according to one embodiment of the present disclosure.

FIG. 7 is a sequence diagram showing still another example of the procedure for UE mobility between beams. In the example shown in FIG. 7, the UE 2 moves between beams while the UE 2 is performing aggregation of three carriers shown in FIG. 4. Accordingly, the carriers #1 and #2 are included in a lower frequency band (e.g., 5 GHz band), while the carrier #3 is included in a higher frequency band (e.g., 30 GHz band).

In Step 701, the NR NB 1 and the UE 2 establish an RRC connection in the carrier #1 (cell #1). In accordance with the terminology of LTE carrier aggregation, the carrier #1 (cell #1) may be referred to as a primary cell (PCell) or a primary component carrier (PCC). In Step 702, the NR NB 1 and the UE 2 perform selection of a serving beam in the carrier #1. The processing in Step 702 may be performed in accordance with the procedure shown in FIG. 5 or 6.

In Step 703, the NR NB 1 sends secondary carrier configuration to the UE 2 and the UE 2 adds the carriers #2 and #3 as secondary carriers. Accordingly, the UE 2 performs aggregation of the three carriers #1, #2, and #3. In Step 704, the NR NB 1 and the UE 2 perform selection of a serving beam in the carrier #2. In Step 705, the NR NB 1 and the UE 2 perform selection of a serving beam in the carrier #3. Each of the processing in Step 704 and that in Step 705 may be performed in accordance with the procedure shown in FIG. 5 or 6. The order of Steps 704 and 705 is not particularly limited. The processing in Steps 704 and 705 may be performed along with the processing in Step 703.

In Step 706, re-selection of a serving beam in the carrier #3 is performed due to, for example, the movement of the UE 2. Since the beam width of the transmission beams in the carrier #3 (e.g., 30 GHz band) is narrower than the beam width of the transmission beams in the carriers #1 and #2 (e.g., 5 GHz band), the beam (re)selection for the carrier #3 is likely to occur more frequently than those for the carriers #1 and #2. The processing in Step 706 may be performed in accordance with the cell selection shown in FIG. 5 or 6 (i.e., Option A1, A2, A3, B1, B2, or B3).

The (re)selection of the serving beam for the UE 2 by the NR NB 1 may be performed based on an uplink signal transmitted by the UE 2. This uplink signal may be, for example, an uplink reference signal (e.g., SRS, beamformed SRS), or signaling such as a RACH preamble. The (re) selection and switching of the serving beam may be performed independently for the uplink beam and the downlink beam, or those for the uplink beam may be performed together with those for the downlink beam. Further or alternatively, the relation between the uplink beam (or beam set) and the downlink beam (or beam set) may be configured in advance, and when beam switching in one of the uplink and the downlink is needed and performed, beam switching in the other of uplink and downlink may be automatically performed.

When the NR NB 1 (or one TRP 101) manages a carrier set including a plurality of carriers, the UE 2 or the NR NB 1 may perform one or both of the beam (re)selection and the beam switching per carrier set at the same timing. As already described above, the carrier set may be, for example, a plurality of carriers belonging to the frequency band (e.g., the carriers #1 and #2 in FIG. 4). Alternatively, the carrier set may be a plurality of carriers in which the same numerology is used. Alternatively, the carrier set may be a plurality of carriers in which a plurality of numerologies handled in a similar way based on a predetermined criterion are used.

Along with one or both of the beam (re)selection and the beam switching performed in a specific carrier/cell, the UE 2 or the NR NB 1 may perform one or both of the beam (re)selection and the beam switching also in other carrier(s)/cell(s) included in the same carrier set as the specific carrier/cell. The specific carrier/cell may be, for example, a primary cell (PCell), a primary carrier, or an anchor carrier in the carrier set. Alternatively, in response to the beam switching in any carrier/cell in the carrier set being triggered, the UE 2 or the NR NB 1 may perform one or both of the beam (re)selection and the beam switching also in other carrier(s)/cell(s) in this carrier set.

In one example, the UE 2 or the NR NB 1 may perform beam (re)selection and beam switching in the primary cell (PCell) and then perform beam (re)selection and beam switching also in other carrier(s)/cell(s) (i.e., a secondary cell (SCell) or a secondary component carrier (SCC)) based on the results of the beam switching in the primary cell (PCell).

In another example, the UE 2 or the NR NB 1 may perform beam (re)selection and beam switching in the anchor carrier in the carrier set and then perform beam (re)selection and beam switching also in other carrier(s)/cell(s) in the same carrier set as the anchor carrier based on the results of the beam switching in the anchor carrier.

In still another example, the UE 2 or the NR NB 1 may perform beam (re)selection and beam switching in any carrier/cell in the carrier set, and then perform, based on the result of the beam switching in this carrier, beam (re)selection and beam switching also in other carrier(s)/cell(s) in this carrier set.

As will be understood from the above description, this embodiment provides several procedures for UE mobility between beams. The UE 2 or the NR NB 1 performs the selection of a serving beam in the layer 2 (e.g., the MAC sublayer). Further, when the UE 2 performs aggregation of a plurality of carriers, the UE 2 or the NR NB 1 may perform beam selection on a carrier-by-carrier basis, that is, in each carrier. Alternatively, the UE 2 or the NR NB 1 may perform beam selection on a per-predefined carrier set basis, that is, in a carrier set. The carrier set may be, for example, a plurality of carriers belonging to the same frequency band (e.g., the carriers #1 and carrier #2). Alternatively, the carrier set may be a plurality of carriers in which the same numerology is used. Alternatively, the carrier set may be a plurality of carriers in which a plurality of numerologies handled in a similar way based on a predetermined criterion are used.

Second Embodiment

Figure 8:
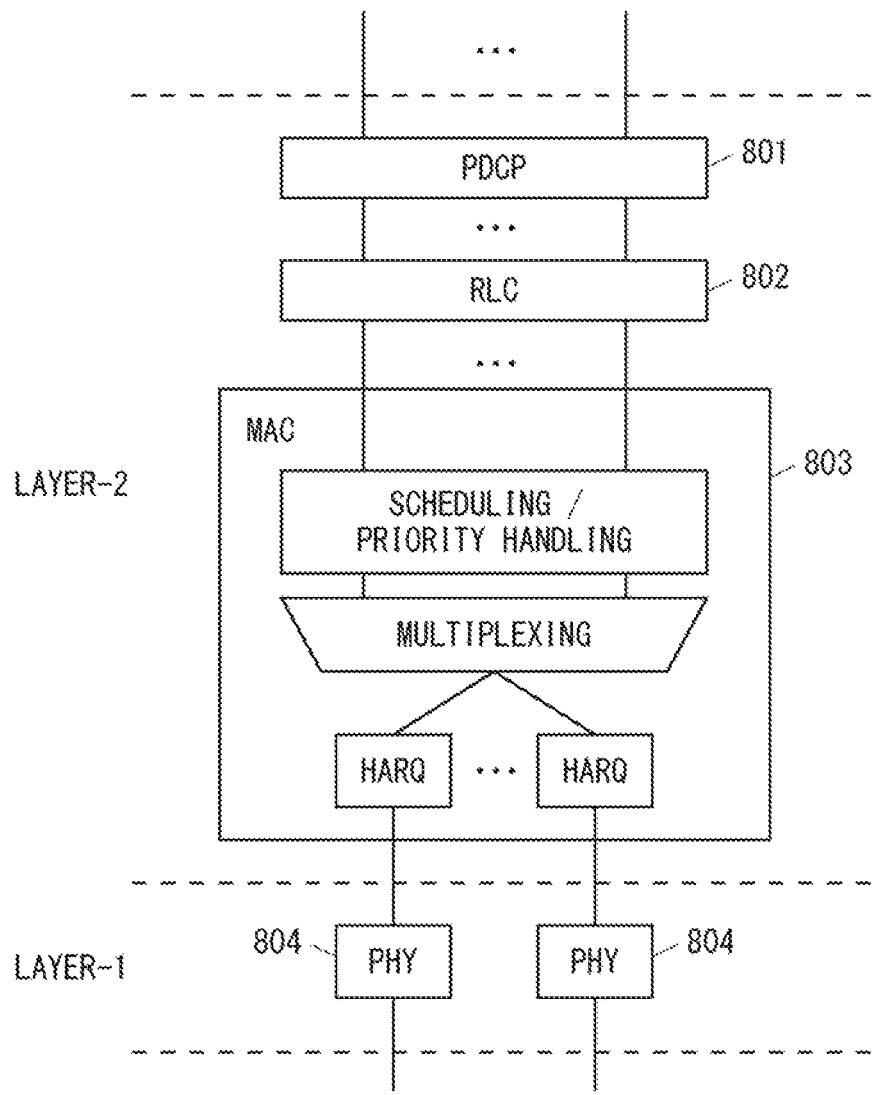
FIG. 8 is a diagram showing one example of a user plane protocol stack for aggregation of multiple carriers with different numerologies according to one embodiment of the present disclosure.

This embodiment describes in more detail a case in which the UE 2 performs aggregation of multiple carriers with different numerologies. FIG. 8 is a diagram showing one example of a user plane protocol stack for aggregation of carriers with different numerologies. The layer 2 incudes a PDCP layer 801, an RLC layer 802, and a MAC layer. In the example shown in FIG. 8, a single MAC entity 803 supports the aggregation of multiple carriers with different numerologies. Accordingly, in the example shown in FIG. 8, in a way similar to that in LTE CA, the multi-carrier nature of the physical layer is exposed only to the MAC layer in which HARQ entities are required for the respective carriers (or serving cells). Each HARQ entity of the MAC entity 803 is associated with the PHY layer 804 of a respective one of the carriers.

The MAC entity 803 performs one or both of the serving beam selection and the serving beam switching. The MAC entity 803 may suspend or stop at least part of the MAC (and PHY) processing only for the carrier or carrier set in which the serving beam switching is to be performed, and then re-start or newly start this processing after the beam switching.

Figure 9:
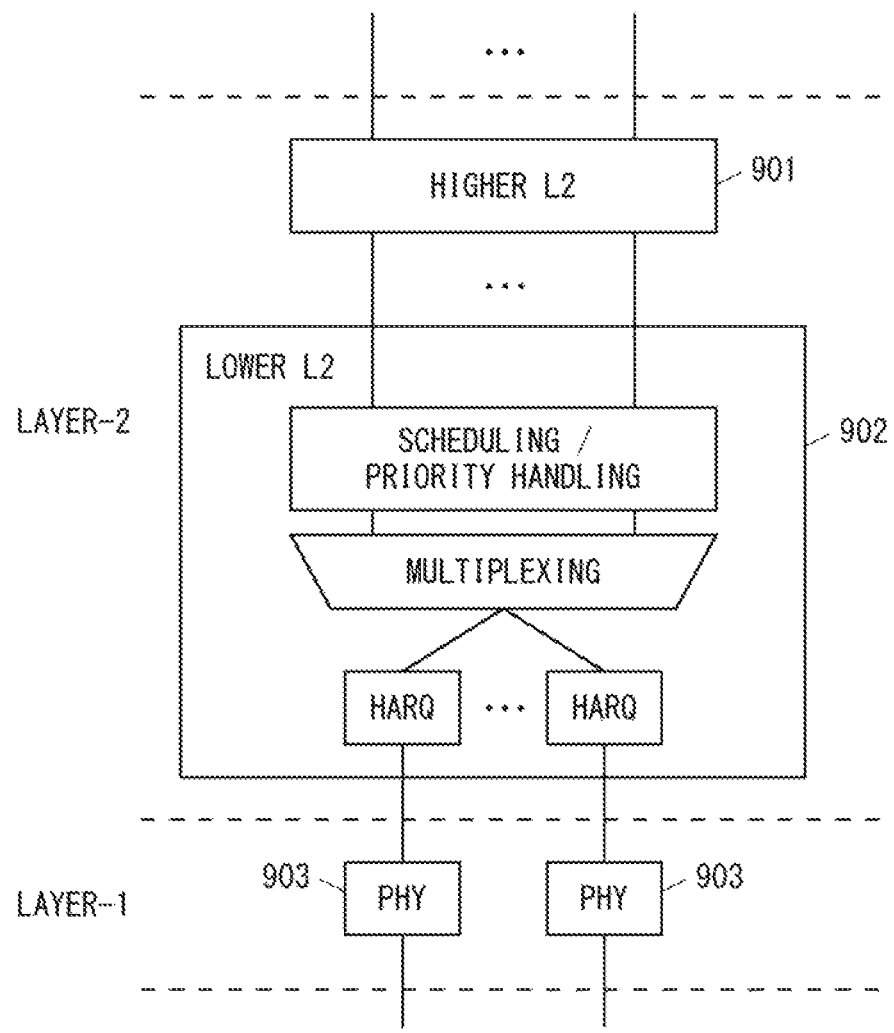
FIG. 9 is a diagram showing one example of a user plane protocol stack for aggregation of multiple carriers with different numerologies according to one embodiment of the present disclosure.

The 3GPP has studied merger or re-arrangement of several functions using the LTE user plane protocol stack as a baseline. For example, the three sublayers of the LTE layer 2 are converged in two sublayers. As shown in FIG. 9, two new sublayers are referred to as, for example, a higher layer-2 and a lower layer-2. The higher layer-2 901 includes, for example, the functions of the PDCP layer 801 and the reordering function of the RLC layer 802. Meanwhile, the lower layer-2 entity 902 includes the concatenation function of the RLC layer 802 and the functions of the MAC layer 803. Further, the 3GPP has also studied merger or re-arrangement of the functions of the layer 2 of LTE while maintaining the three sublayers. For example, the reordering function of the PDCP layer 801 may be merged with part of the reordering function of the RLC layer 802, or the concatenation function of the RLC layer 802 may be added to (or re-defined as) the function(s) of the MAC layer. This embodiment and the other embodiments can be applied to the NR layer 2 even when the configuration of the NR layer 2 is changed from the configuration of the existing LTE layer 2.

Third Embodiment

Figure 10:
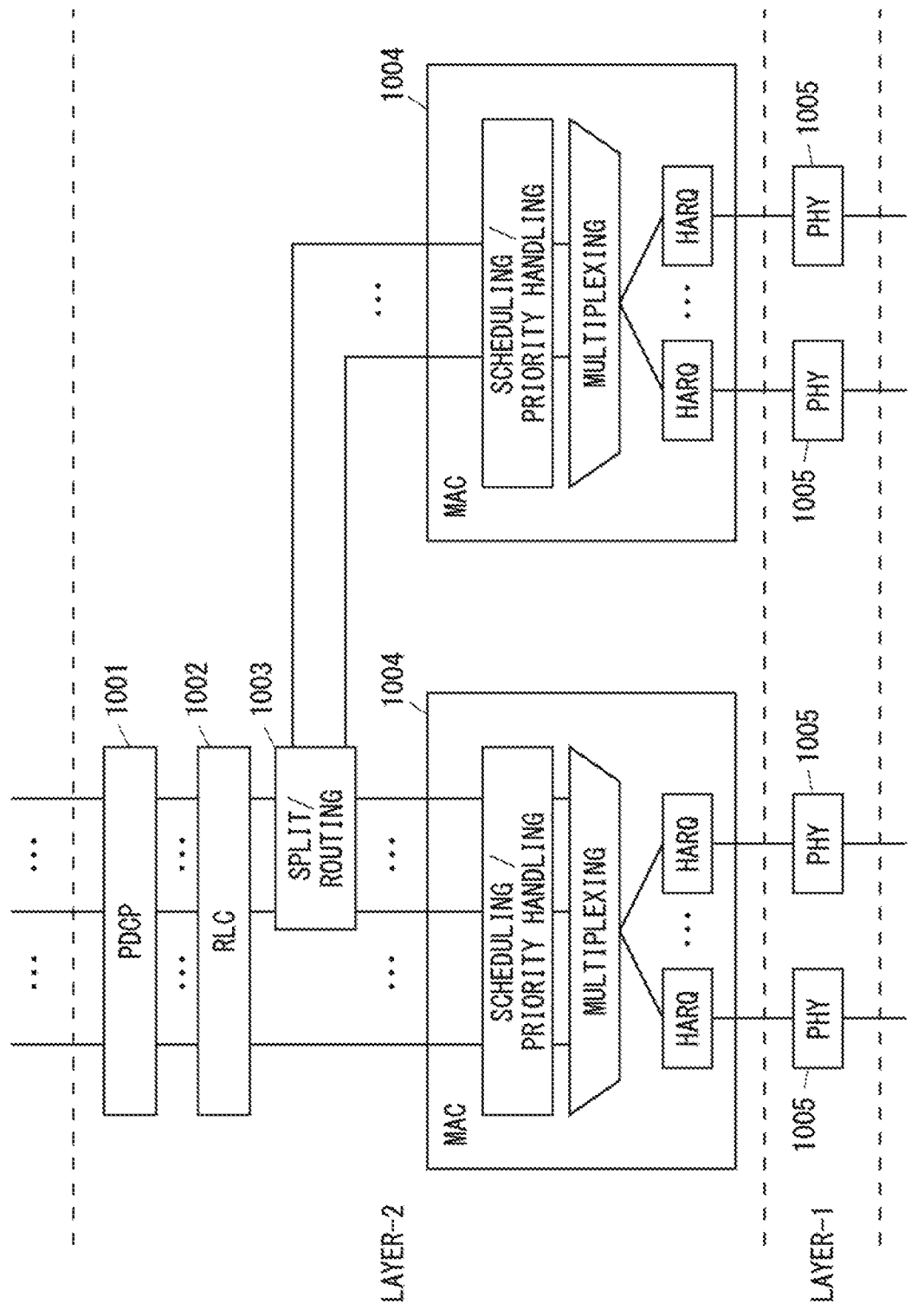
FIG. 10 is a diagram showing one example of a user plane protocol stack for aggregation of multiple carriers with different numerologies according to one embodiment of the present disclosure.

This embodiment describes in more detail a case in which the UE 2 performs aggregation of multiple carriers with different numerologies. FIG. 10 is a diagram showing another example of the user plane protocol stack for aggregation of multiple carriers with different numerologies. In the example shown in FIG. 10, a plurality of MAC entities 1004 are used for aggregation of multiple carriers with different numerologies. Each MAC entity 1004 is associated with one or a plurality of carriers (i.e., carrier set) of one numerology. A PDCP layer 1001 generates PDCP PDUs, while an RLC layer 1002 generates RLC PDUs. The RLC PDUs of a single bearer or a single flow is routed to one of the MAC entities 1004, or may be split and sent to the plurality of MAC entities 1004 (1003). Each HARQ entity of each MAC entity 1004 is associated with the PHY layer 1005 of a respective one of the carriers.

When the serving beam selection and the serving beam switching are performed in a single carrier or a single carrier set, only the corresponding MAC entity 1004 may perform reset of the MAC (and PHY), update of the configuration information, or reconfiguration.

Figure 11:
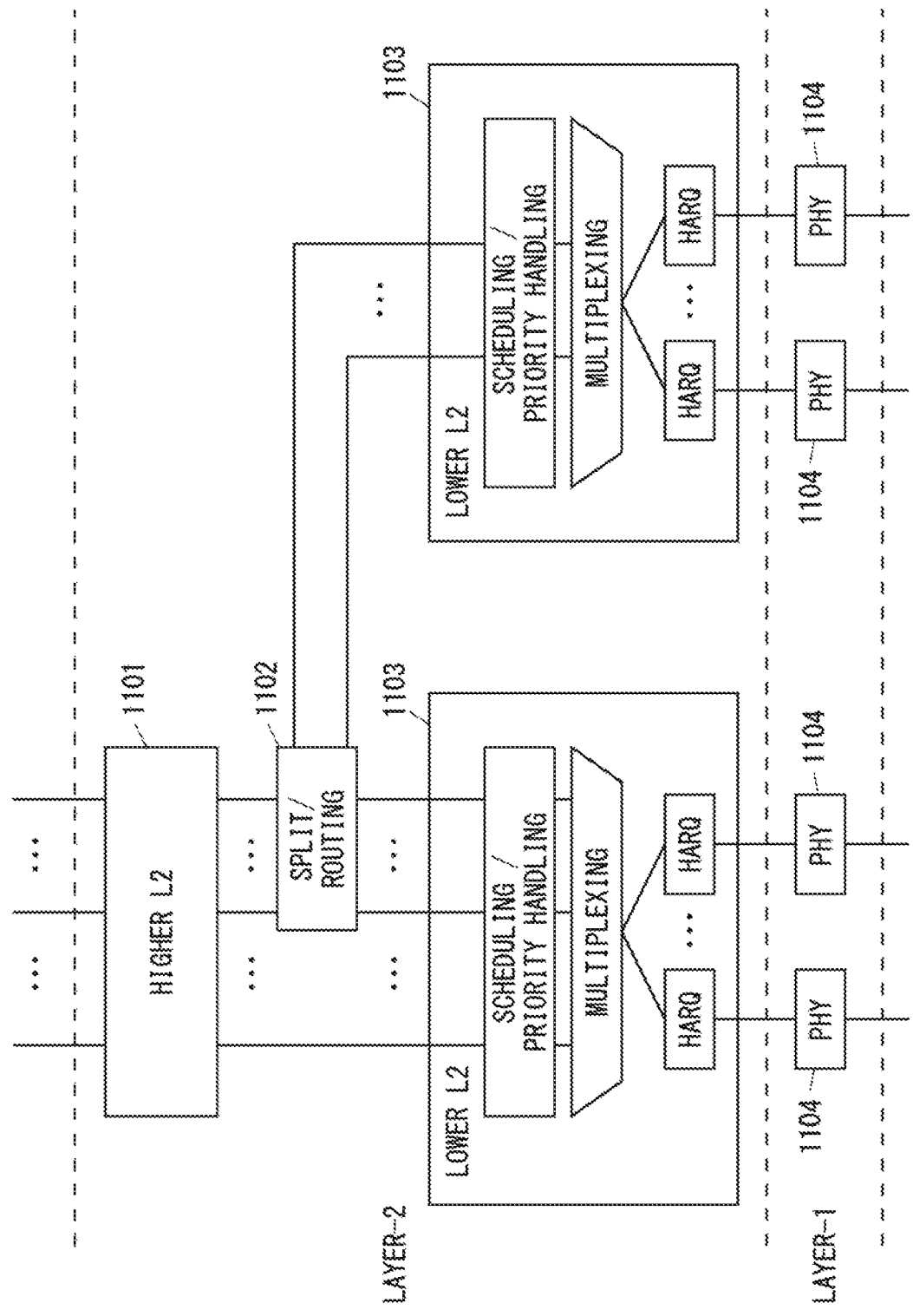
FIG. 11 is a diagram showing one example of a user plane protocol stack for aggregation of multiple carriers with different numerologies according to one embodiment of the present disclosure.

As described in the second embodiment, the 3GPP has studied merger or re-arrangement of several functions using the LTE user plane protocol stack as a baseline. Accordingly, the protocol stack shown in FIG. 10 may be changed as shown in FIG. 11. In the example shown in FIG. 11, the layer 2 includes a higher layer-2 and a lower layer-2. The higher layer-2 1101 includes, for example, the functions of the PDCP layer 1001 and the reordering function of the RLC layer 1002. Meanwhile, the lower layer-2 entity 1103 includes the concatenation function of the RLC layer 1002 and the functions of the MAC entity 1104.

Fourth Embodiment

This embodiment provides specific examples of configuration and processing required for aggregation of multiple carriers with different numerologies.

Before the aggregation (i.e., preparation phase), the UE 2 may perform Radio Resource Management (RRM) measurement reporting for non-serving cell(s) or deactivated Secondary Component Carrier(s) (SCC(s)) (i.e., SCell(s)). The UE 2 may further perform beam measurement reporting.

In configuration and activation of the aggregation, the NR NB 1 may send an instruction to the UE 2 via RRC signaling (e.g., RRCConnectionReconfiguration message) to perform configuration. In the aggregation of NR carriers, the SCell Activation delay may be defined as follows. Just for reference, in the LTE carrier aggregation (CA), when the UE receives the Activation/Deactivation MAC CE indicating the activation in the subframe # n, the UE starts a valid Channel Quality Indicator (CQI) feedback no later than the subframe # n+8. In NR, a SCell(s) may be started from an Activated state when it is configured. Instead, in NR, L1/L2 control signaling (e.g., Physical Downlink Control Channel (PDCCH)) may be used, in place of Activation/Deactivation MAC CE, for activation/deactivation of a SCell(s).

Alternatively, in NR, a SCell(s) may be started from a deactivated state, similar to the case in LTE. In this case, different SCell Activation delays may be applied to multiple carriers with different numerologies. For example, SCell Activation delays that are scaled in accordance with the difference in their subframe lengths or TTIs may be used for different numerologies. Alternatively, the same SCell Activation delay may be applied to multiple carriers with different numerologies.

Some parameters used during the execution of aggregation of multiple carriers with different numerologies may be defined as follows.

(a) PDCCH Subframe

The PDCCH subframe in which the UE 2 performing Discontinuous Reception (DRX) needs to monitor PDCCH (or to attempt to decode PDCCH) may be determined as follows. In accordance with the definition of the LTE, the PDCCH subframe for each numerology may be determined based on the subframe length that is defined (or derived) from the numerology of the reference carrier (or cell) (e.g., PCell, anchor carrier per carrier set). When the UE 2 performs at least part of the MAC functionality (e.g., DRX) individually for each carrier set, the length of the PDCCH subframe may differ between the carrier sets.

(b) Power Headroom Report (PHR)

A new PHR format may be defined for aggregation of multiple carriers with different numerologies. The UE 2 may trigger a PHR when a carrier (cell) with a numerology other than the numerologies of carriers that have already been added is newly added (e.g., at the time of configuration or activation). In a case where the UE 2 uses a plurality of MAC entities for aggregation of multiple carriers with different numerologies, when a PHR is triggered for a carrier (or cell) managed by any MAC entity, all the MAC entities may transmit PHRs for the carriers (or cells) managed by the respective MAC entities. Alternatively, all the MAC entities may transmit PHRs for all the carriers (cells) that the UE 2 aggregates.

(c) Scheduling Request (SR), Buffer Status Report (BSR), Physical Uplink Control Channel (PUCCH)

The UE 2 may perform at least one of: SR transmission; BSR transmission; and transmission of the control information, for each carrier set having the same numerology. In this case, Data Radio Bearer (DRB) or flow (e.g., Protocol Data Unit (PDU) session) may be restricted in such a way that it is used only in one carrier set having the same numerology.

(d) Discontinuous Reception (DRX)

At least one of: determination of the Active Time of DRX; determination of DRX state transition; and configuration of DRX parameters may be performed per carrier set having the same numerology.

(e) Random Access Channel (RACH)

At least the transmission of a RACH preamble and the transmission and reception of a Random Access Response (RAR) in the Random Access procedure may be performed for each carrier set having the same numerology. Meanwhile, at least part of the Random Access procedure may be performed using carriers (or carrier sets) having different numerologies. In this case, the RAR transmission and reception may be performed always in a specific reference carrier (or cell) (e.g., PCell, anchor carrier of the carrier set used for the RACH preamble transmission).

(f) Cross-Carrier Scheduling

Cross-carrier scheduling may be performed only within a carrier set having the same numerology. On the other hand, when cross-carrier scheduling is performed between carriers (or carrier sets) having different numerologies, the timing (e.g., slot, subframe or TTI, or the boundary thereof) defined by (or derived from) the carrier (or the numerology thereof) at the time when downlink control information (e.g., PDCCH) including downlink (DL) radio resource allocation information or uplink (UL) radio resources-grant is received by the UE 2 may be used as a reference timing to determine the timing of DL data reception or UL data transmission in the scheduled carrier. Alternatively, the timing determined in the scheduled carrier (or the numerology thereof) at the time when the downlink control information is received by the UE 2 may be used as the reference timing to determine the timing of DL data reception or UL data transmission.

(g) Round Trip Time (RTT) of HARQ

HARQ RTT for each numerology may be determined based on a TTI (or a subframe length) defined by (or derived from) the numerology of a reference carrier (or cell) (e.g., PCell, anchor carrier per carrier set). HARQ RTT in NR may be a value similar to that in LTE (e.g., 5 TTIs in the case of Frequency Division Duplexing (FDD)). Scaling in accordance with TTI may be applied to HARQ RTT in NR.

Figure 12:
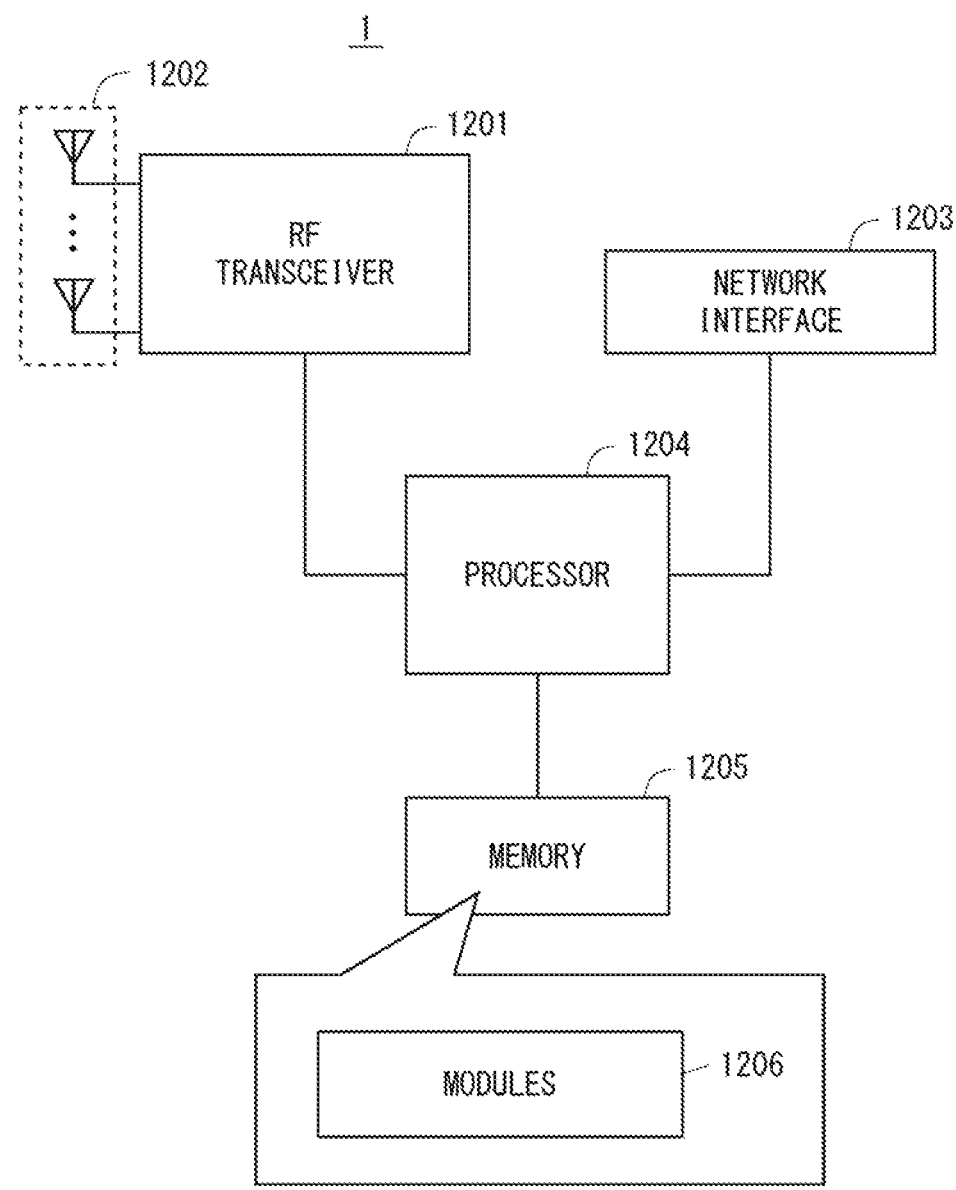
FIG. 12 is a block diagram showing a configuration example of a base station according to one embodiment of the present disclosure.

The following provides configuration examples of the NR NB 1 and the UE 2 according to the above embodiments. FIG. 12 is a block diagram showing a configuration example of the NR NB 1 according to the above embodiments. Referring to FIG. 12, the NR NB 1 includes a Radio Frequency transceiver 1201, a network interface 1203, a processor 1204, and a memory 1205. The RF transceiver 1201 performs analog RF signal processing to communicate with the NG UEs including the UE 2. The RF transceiver 1201 may include a plurality of transceivers. The RF transceiver 1201 is coupled to an antenna array 1202 and the processor 1204. The RF transceiver 1201 receives modulated symbol data from the processor 1204, generates a transmission RF signal, and supplies the transmission RF signal to the antenna array 1202. Further, the RF transceiver 1201 generates a baseband reception signal based on a reception RF signal received by the antenna array 1202, and supplies the baseband reception signal to the processor 1204. The RF transceiver 1201 may include an analog beamformer circuit for beam forming. The analog beamformer circuit includes, for example, a plurality of phase shifters and a plurality of power amplifiers.

The network interface 1203 is used to communicate with a network node (e.g., a control node and a transfer node of NG Core). The network interface 1203 may include, for example, a network interface card (NIC) conforming to the IEEE 802.3 series.

The processor 1204 performs digital baseband signal processing (i.e., data-plane processing) and control-plane processing for radio communication. The processor 1204 may include a plurality of processors. The processor 1204 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 1204 may include a digital beamformer module for beam forming. The digital beamformer module may include a Multiple Input Multiple Output (MIMO) encoder and a pre-coder.

The memory 1205 is composed of a combination of a volatile memory and a non-volatile memory. The volatile memory is, for example, a Static Random Access Memory (SRAM), a Dynamic RAM (DRAM), or any combination thereof. The non-volatile memory is, for example, a mask Read Only Memory (MROM), an Electrically Erasable Programmable ROM (EEPROM), a flash memory, a hard disc drive, or any combination thereof. The memory 1205 may include a storage located apart from the processor 1204. In this case, the processor 1204 may access the memory 1205 via the network interface 1203 or an I/O interface (not shown).

The memory 1205 may store one or more software modules (computer programs) 1206 including instructions and data to perform processing by the NR NB 1 described in the above embodiments. In some implementations, the processor 1204 may be configured to load the software modules 1206 from the memory 1205 and execute the loaded software modules, thereby performing processing of the NR NB 1 described in the above embodiments.

Figure 13:
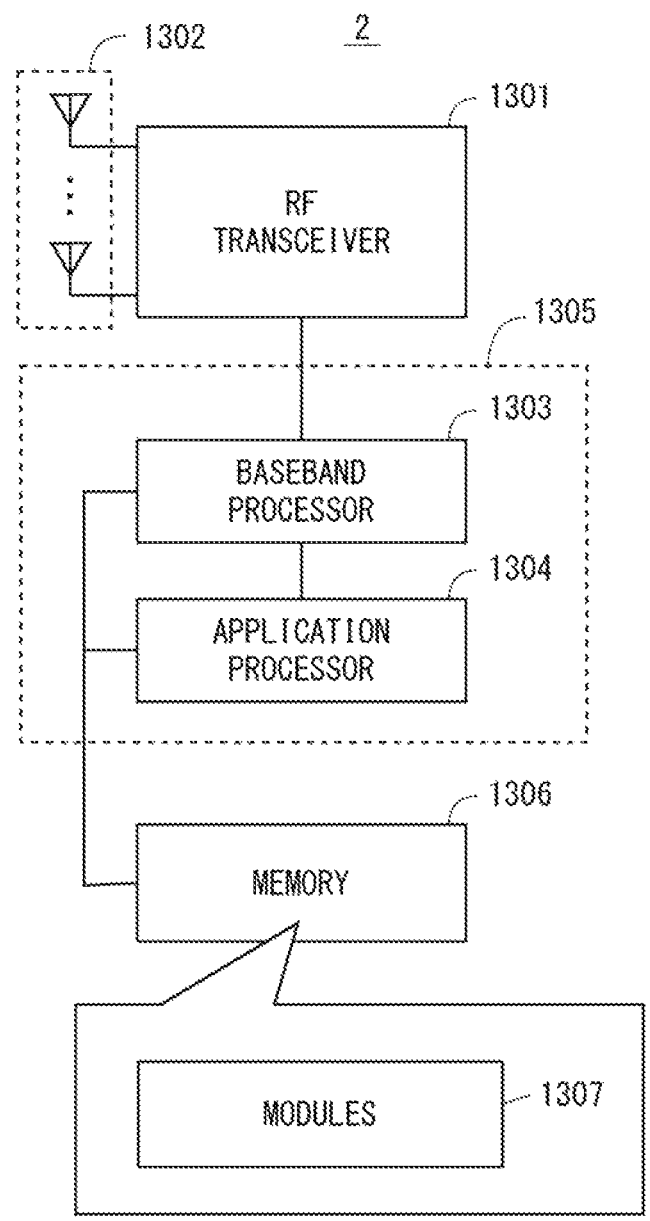
FIG. 13 is a block diagram showing a configuration example of a radio terminal according to one embodiment of the present disclosure.

FIG. 13 is a block diagram showing a configuration example of the UE 2. A Radio Frequency (RF) transceiver 1301 performs analog RF signal processing to communicate with the NR NB 1. The RF transceiver 1301 may include a plurality of transceivers. The analog RF signal processing performed by the RF transceiver 1301 includes frequency up-conversion, frequency down-conversion, and amplification. The RF transceiver 1301 is coupled to an antenna array 1302 and a baseband processor 1303. The RF transceiver 1301 receives modulated symbol data (or OFDM symbol data) from the baseband processor 1303, generates a transmission RF signal, and supplies the transmission RF signal to the antenna array 1302. Further, the RF transceiver 1301 generates a baseband reception signal based on a reception RF signal received by the antenna array 1302, and supplies the baseband reception signal to the baseband processor 1303. The RF transceiver 1301 may include an analog beamformer circuit for beam forming. The analog beamformer circuit includes, for example, a plurality of phase shifters and a plurality of power amplifiers.

The baseband processor 1303 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARD) processing), and layer 3 (e.g., signaling regarding attach, mobility, and call management).

The digital baseband signal processing by the baseband processor 1303 may include, for example, signal processing of a Packet Data Convergence Protocol (PDCP) layer, a Radio Link Control (RLC) layer, a MAC layer, and a PHY layer. Further, the control-plane processing performed by the baseband processor 1303 may include processing of a Non-Access Stratum (NAS) protocol, an RRC protocol, and MAC CEs.

The baseband processor 1303 may perform MIMO encoding and pre-coding for beam forming.

The baseband processor 1303 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1304 described in the following.

The application processor 1304 is also referred to as a CPU, an MPU, a microprocessor, or a processor core. The application processor 1304 may include a plurality of processors (processor cores). The application processor 1304 loads a system software program (Operating System (OS)) and various application programs (e.g., a call application, a WEB browser, a mailer, a camera operation application, and a music player application) from a memory 1306 or from another memory (not shown) and executes these programs, thereby providing various functions of the UE 2.

In some implementations, as represented by a dashed line (1305) in FIG. 13, the baseband processor 1303 and the application processor 1304 may be integrated on a single chip. In other words, the baseband processor 1303 and the application processor 1304 may be implemented in a single System on Chip (SoC) device 1305. An SoC device may be referred to as a system Large Scale Integration (LSI) or a chipset.

The memory 1306 is a volatile memory, a non-volatile memory, or a combination thereof. The memory 1306 may include a plurality of memory devices that are physically independent from each other. The volatile memory is, for example, an SRAM, a DRAM, or any combination thereof. The non-volatile memory is, for example, an MROM, an EEPROM, a flash memory, a hard disc drive, or any combination thereof. The memory 1306 may include, for example, an external memory device that can be accessed from the baseband processor 1303, the application processor 1304, and the SoC 1305. The memory 1306 may include an internal memory device that is integrated in the baseband processor 1303, the application processor 1304, or the SoC 1305. Further, the memory 1306 may include a memory in a Universal Integrated Circuit Card (UICC).

The memory 1306 may store one or more software modules (computer programs) 1307 including instructions and data to perform the processing by the UE 2 described in the above embodiments. In some implementations, the baseband processor 1303 or the application processor 1304 may load these software modules 1307 from the memory 1306 and execute the loaded software modules, thereby performing the processing of the UE 2 described in the above embodiments with reference to the drawings.

As described above with reference to FIGS. 12 and 13, each of the processors included in the NR NB 1 and the UE 2 according to the above embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magnetooptical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

Each of the above-described embodiments may be used individually, or two or more embodiments may be appropriately combined with one another.

In the above embodiments, the UE 2 may aggregate carriers belonging to different frequency bands (e.g., 6 GHz band and 30 GHz band). The carriers belonging to different frequency bands may use the same numerology. That is, in the above embodiments, the NR NB 1 and the UE 2 may support aggregation of carriers belonging to different frequency bands and having the same numerology. The UE 2 or the NR NB 1 may perform beam selection on a per-predefined carrier set basis (i.e., perform beam selection within a carrier set). The carrier set may be, for example, a plurality of carriers belonging to the same frequency band.

In the above-embodiments, the operations of the NR NB 1 and the UE 2 may be applied to a case in which the UE 2 performs Dual Connectivity (e.g., functions evolved in such a way as to implement an existing DC under Inter-RAT environment) of the NR NB 1 and LTE (or eLTE, which is an evolution system of LTE) eNB. When, for example, the (e)LTE eNB is operated as a Master Node (M-NB) and the NR NB 1 is operated as a Secondary Node (S-NB) for the UE 2, a cell group composed of one or more cells managed by the NR NB 1 may be used as a secondary cell group (SCG). In this case, the above embodiments may be applied to a cell(s) in the SCG. Note that, Dual Connectivity of the NR NB 1 and LTE eNB may be referred to as Multi Connectivity. Multi Connectivity may be expressed as an operation mode configured so as to allow a UE including a plurality of transceivers to use a plurality of radio resources provided by schedulers (of RAN nodes) connected via a non-ideal backhaul.

In the above embodiments, a beam (or a beam set) may be associated with a network slice (NS) in Network Slicing. For example, a plurality of network slices that satisfy respective different service requirements may be configured (or implemented) and these network slices may correspond to (or be associated with) respective beams (or respective beam sets). In this case, the NR NB 1 and the UE 2 may operate to select a network slice that corresponds to the service that is being performed (or that will be performed) by the UE 2 and select a beam (or a beam set) that corresponds to the selected network slice. It is thus possible to select a beam (or a beam set) that is desired by (or optimal to) the UE 2, whereby it is expected that communication characteristics (and service quality) will be improved.

The above-described embodiments are merely examples of applications of the technical ideas obtained by the inventor. These technical ideas are not limited to the above-described embodiments and various modifications can be made thereto.

For example, the whole or part of the above embodiments can be described as, but not limited to, the following supplementary notes.

(Supplementary Note 1)

A radio terminal comprising:

a wireless transceiver configured to transmit signals to a base station and receive signals from the base station; and at least one processor configured to:

receive beam configuration information from the base station;

measure a first plurality of transmission beams transmitted from the base station in accordance with the beam configuration information; and use, as a first serving beam for transmission from the base station to the radio terminal, one or more beams selected from among the first plurality of transmission beams based on a measurement result of the first plurality of transmission beams, wherein each of the first plurality of transmission beams carries a beamformed reference signal to be measured by the radio terminal, and the beam configuration information includes reference signal configuration indicating a radio resource used on each beam for transmitting the beamformed reference signal.

(Supplementary Note 2)

The radio terminal according to Supplementary Note 1, wherein each of the first plurality of transmission beams carries a signal indicating a beam identifier, and the beam configuration information indicates the beam identifiers of the respective beams.

(Supplementary Note 3)

The radio terminal according to Supplementary Note 1 or 2, wherein the at least one processor is configured to select the first serving beam from among the first plurality of transmission beams based on the measurement result of the first plurality of transmission beams, and the beam configuration information further includes a selection criterion of the first serving beam.

(Supplementary Note 4)

The radio terminal according to Supplementary Note 3, wherein at least one of selecting of the first serving beam and switching of a serving beam is performed in a Medium Access Control (MAC) sublayer.

(Supplementary Note 5)

The radio terminal according to Supplementary Note 1 or 2, wherein the at least one processor is configured to:

transmit, to the base station, beam information based on the measurement result of the first plurality of transmission beams; and receive, from the base station, a message indicating the first serving beam, which is selected by the base station based on the beam information.

(Supplementary Note 6)

The radio terminal according to any one of Supplementary Notes 1 to 5, wherein the at least one processor is configured to:

measure a second plurality of transmission beams transmitted from the base station; and use, as a second serving beam for transmission from the base station to the radio terminal, one or more beams selected from among the second plurality of transmission beams based on a measurement result of the second plurality of transmission beams, the first plurality of transmission beams use a first carrier, the second plurality of transmission beams use a second carrier, and the at least one processor is further configured to perform aggregation of the first carrier and the second carrier.

(Supplementary Note 7)

The radio terminal according to Supplementary Note 6, wherein the at least one processor is configured to, during execution of the aggregation, perform switching of the first serving beam among the first plurality of transmission beams belonging to the first carrier and perform switching of the second serving beam among the second plurality of transmission beams belonging to the second carrier.

(Supplementary Note 8)

The radio terminal according to Supplementary Note 6 or 7, wherein the at least one processor is configured to perform switching of the second serving beam among the second plurality of transmission beams belonging to the second carrier, in response to switching of the first serving beam among the first plurality of transmission beams belonging to the first carrier being triggered.

(Supplementary Note 9)

The radio terminal according to any one of Supplementary Notes 6 to 8, wherein the at least one processor is configured to provide a single Medium Access Control (MAC) entity that performs downlink reception on both the first serving beam belonging to the first carrier and the second serving beam belonging to the second carrier.

(Supplementary Note 10)

The radio terminal according to Supplementary Note 9, wherein the MAC entity is configured to, when switching of a serving beam in the first carrier is performed, suspend or stop at least part of MAC layer processing for the first carrier but to continue MAC layer processing for the second carrier.

(Supplementary Note 11)

The radio terminal according to any one of Supplementary Notes 6 to 8, wherein the at least one processor is configured to provide a first MAC entity that performs downlink reception on the first serving beam belonging to the first carrier and provide a second Medium Access Control (MAC) entity that performs downlink reception on the second serving beam belonging to the second carrier.

(Supplementary Note 12)

The radio terminal according to Supplementary Note 11, wherein the first MAC entity is configured to perform resetting of MAC, update of configuration information, or re-configuration when switching of a serving beam in the first carrier is performed, and the second MAC entity is configured to continue MAC layer processing regardless of the switching of the serving beam in the first carrier.

(Supplementary Note 13)

The radio terminal according to any one of Supplementary Notes 6 to 12, wherein a frequency band in which the first carrier is included is different from a frequency band in which the second carrier is included.

(Supplementary Note 14)

The radio terminal according to any one of Supplementary Notes 6 to 13, wherein the first carrier and the second carrier are different from each other in at least one of subcarrier spacing, symbol length, a Transmission Time Interval (TTI), and subframe duration.

(Supplementary Note 15)

The radio terminal according to any one of Supplementary Notes 1 to 14, wherein the first plurality of transmission beams each carry signals indicating the same identifiers or the same group identifiers.

(Supplementary Note 16)

A base station comprising:

at least one wireless transceiver configured to transmit signals to a radio terminal and receive signals from the radio terminal; and at least one processor configured to:

transmit beam configuration information to the radio terminal; and use, as a first serving beam for transmission from the base station to the radio terminal, one or more beams selected from among a first plurality of transmission beams transmitted from the base station based on a result of a measurement by the radio terminal of the first plurality of transmission beams, wherein each of the first plurality of transmission beams carries a beamformed reference signal to be measured by the radio terminal, and the beam configuration information includes reference signal configuration indicating a radio resource used on each beam for transmitting the beamformed reference signal.

(Supplementary Note 17)

The base station according to Supplementary Note 16, wherein the at least one processor is configured to receive, from the radio terminal, a message indicating the first serving beam selected by the radio terminal based on the measurement result of the first plurality of transmission beams.

(Supplementary Note 18)

The base station according to Supplementary Note 16, wherein the at least one processor is configured to:

receive, from the radio terminal, beam information based on the measurement result of the first plurality of transmission beams;

select the first serving beam from among the first plurality of transmission beams based on the beam information; and transmit a message indicating the first serving beam selected by the base station to the radio terminal.

(Supplementary Note 19)

The base station according to any one of Supplementary Notes 16 to 18, wherein the at least one processor is configured to use, as a second serving beam for transmission from the base station to the radio terminal, one or more beams selected from among a second plurality of transmission beams transmitted from the base station based on a result of a measurement by the radio terminal of the second plurality of transmission beams, the first plurality of transmission beams use a first carrier, the second plurality of transmission beams use a second carrier, and the at least one processor is further configured to perform aggregation of the first carrier and the second carrier.

(Supplementary Note 20)

The base station according to Supplementary Note 19, wherein the at least one processor is configured to, during execution of the aggregation, perform switching of the first serving beam among the first plurality of transmission beams belonging to the first carrier and perform switching of the second serving beam among the second plurality of transmission beams belonging to the second carrier.

(Supplementary Note 21)

The base station according to Supplementary Note 19 or 20, wherein the at least one processor is configured to perform switching of the second serving beam among the second plurality of transmission beams belonging to the second carrier, in response to switching of the first serving beam among the first plurality of transmission beams belonging to the first carrier being triggered.

(Supplementary Note 22)

The base station according to any one of Supplementary Notes 19 to 21, wherein the at least one processor is configured to provide a single Medium Access Control (MAC) entity that performs downlink transmission on both the first serving beam belonging to the first carrier and the second serving beam belonging to the second carrier.

(Supplementary Note 23)

The base station according to Supplementary Note 22, wherein the MAC entity is configured to, when switching of a serving beam in the first carrier is performed, suspend or stop at least part of MAC layer processing for the first carrier but to continue MAC layer processing for the second carrier.

(Supplementary Note 24)

The base station according to any one of Supplementary Notes 19 to 21, wherein the at least one processor is configured to provide a first MAC entity that performs downlink transmission on the first serving beam belonging to the first carrier and provide a second Medium Access Control (MAC) entity that performs downlink transmission on the second serving beam belonging to the second carrier.

(Supplementary Note 25)

The base station according to Supplementary Note 24, wherein the first MAC entity is configured to perform resetting of MAC, update of configuration information, or re-configuration when switching of a serving beam in the first carrier is performed, and the second MAC entity is configured to continue MAC layer processing regardless of the switching of the serving beam in the first carrier.

(Supplementary Note 26)

The base station according to any one of Supplementary Notes 19 to 25, wherein the first carrier and the second carrier are different from each other in at least one of subcarrier spacing, symbol length, a Transmission Time Interval (TTI), and subframe duration.

(Supplementary Note 27)

The base station according to any one of Supplementary Notes 16 to 26, wherein the at least one transceiver comprises a plurality of distributed Remote Radio Heads (RRHs) or Transmission and Reception Points (TRPs).

(Supplementary Note 28)

A method for a radio terminal, the method comprising:

receiving beam configuration information from a base station;

measuring a first plurality of transmission beams transmitted from the base station in accordance with the beam configuration information; and using, as a first serving beam for transmission from the base station to the radio terminal, one or more beams selected from among the first plurality of transmission beams based on a measurement result of the first plurality of transmission beams, wherein each of the first plurality of transmission beams carries a beamformed reference signal to be measured by the radio terminal, and the beam configuration information includes reference signal configuration indicating a radio resource used on each beam for transmitting the beamformed reference signal.

(Supplementary Note 29)

A method for a base station, the method comprising:

transmitting beam configuration information to a radio terminal; and using, as a first serving beam for transmission from the base station to the radio terminal, one or more beams selected from among a first plurality of transmission beams transmitted from the base station based on a result of a measurement by the radio terminal of the first plurality of transmission beams, wherein each of the first plurality of transmission beams carries a beamformed reference signal to be measured by the radio terminal, and the beam configuration information includes reference signal configuration indicating a radio resource used on each beam for transmitting the beamformed reference signal.

(Supplementary Note 30)

A non-transitory computer readable medium storing a program for causing a computer to perform a method for a radio terminal, wherein the method comprises:

receiving beam configuration information from a base station;

measuring a first plurality of transmission beams transmitted from the base station in accordance with the beam configuration information; and using, as a first serving beam for transmission from the base station to the radio terminal, one or more beams selected from among a first plurality of transmission beams based on a measurement result of the first plurality of transmission beams, wherein each of the first plurality of transmission beams carries a beamformed reference signal to be measured by the radio terminal, and the beam configuration information includes reference signal configuration indicating a radio resource used on each beam for transmitting the beamformed reference signal.

(Supplementary Note 31)

A non-transitory computer readable medium storing a program for causing a computer to perform a method for a base station, wherein the method comprises:

transmitting beam configuration information to a radio terminal; and using, as a first serving beam for transmission from the base station to the radio terminal, one or more beams selected from among a first plurality of transmission beams transmitted from the base station based on a result of a measurement by the radio terminal of the first plurality of transmission beams, wherein each of the first plurality of transmission beams carries a beamformed reference signal to be measured by the radio terminal, and the beam configuration information includes reference signal configuration indicating a radio resource used on each beam for transmitting the beamformed reference signal.

This application is based upon and claims the benefit of priority from Japanese Patent Application No. 2016-192329, filed on Sep. 29, 2016, the disclosure of which is incorporated herein in its entirety by reference.

REFERENCE SIGNS LIST

1 NEW RADIO (NR) NODEB (NB)
2 USER EQUIPMENT (UE)
10 BEAM
101 TRANSMISSION AND RECEPTION POINT (TRP)
1204 PROCESSOR
1205 MEMORY
1303 BASEBAND PROCESSOR
1304 APPLICATION PROCESSOR
1306 MEMORY

The invention claimed is:

1. A radio terminal comprising:
a wireless transceiver configured to transmit signals to a base station and receive signals from the base station; and
at least one processor configured to:
perform carrier aggregation of a first cell and a second cell; and
perform, in a Medium Access Control (MAC) layer, selection or switching of a serving beam in the first cell or in the second cell,
wherein the selection or switching of the serving beam is performed independently in the first cell and in the second cell, and
wherein the at least one processor is further configured to perform, in the MAC layer, the selection or switching of the serving beam in the first cell without impacting on MAC layer processing for the second cell.

2. The radio terminal according to claim 1, wherein the at least one processor is configured to:
receive beam configuration information from the base station;
measure, in accordance with the beam configuration information, a first plurality of beams transmitted in the first cell from the base station and a second plurality of beams transmitted in the second cell from the base station;
report to the base station on beam quality of one or more beams included in the first plurality of beams or in the second plurality of beams, based on a measurement result of the first plurality of beams or the second plurality of beams;
receive, from the base station, beam switching information about at least one of the first cell and the second cell; and
use a beam assigned by the beam switching information as the serving beam in the first cell or in the second cell.

3. A method performed by a radio terminal, the method comprising:
performing carrier aggregation of a first cell and a second cell; and
performing, in a Medium Access Control (MAC) layer, selection or switching of a serving beam in the first cell or in the second cell,
wherein the selection or switching of the serving beam is performed independently in the first cell and in the second cell, and
wherein the selection or switching of the serving beam in the first cell is performed in the MAC layer without impacting on MAC layer processing for the second cell.

4. The method according to claim 3, wherein said performing the selection or switching of the serving beam comprises:
receiving beam configuration information from a base station;
measuring, in accordance with the beam configuration information, a first plurality of beams transmitted in the first cell from the base station and a second plurality of beams transmitted in the second cell from the base station;
reporting to the base station on beam quality of one or more beams included in the first plurality of beams or in the second plurality of beams, based on a measurement result of the first plurality of beams or the second plurality of beams;
receiving, from the base station, beam switching information about at least one of the first cell and the second cell; and
using a beam assigned by the beam switching information as the serving beam in the first cell or in the second cell.

* * * * *